US009740468B2

(12) United States Patent
Arrouye et al.

(10) Patent No.: US 9,740,468 B2
(45) Date of Patent: Aug. 22, 2017

(54) CLOUD-BASED APPLICATION RESOURCE FILES

(71) Applicant: Apple Inc., Cupertino, CA (US)

(72) Inventors: Yan Arrouye, Los Altos, CA (US); Dominic B. Giampaolo, Mountain View, CA (US); James Mensch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/740,145

(22) Filed: Jun. 15, 2015

(65) Prior Publication Data

US 2015/0277889 A1    Oct. 1, 2015

Related U.S. Application Data

(63) Continuation of application No. 13/473,560, filed on May 16, 2012, now Pat. No. 9,086,937.

(51) Int. Cl.
| | |
|---|---|
| *G06F 15/16* | (2006.01) |
| *G06F 9/445* | (2006.01) |
| *H04L 29/08* | (2006.01) |

(52) U.S. Cl.
CPC ............... *G06F 8/61* (2013.01); *H04L 67/06* (2013.01); *H04L 67/10* (2013.01);
(Continued)

(58) Field of Classification Search
CPC ...... G06F 8/61; G06F 17/30194; G06F 9/445; H04N 21/2747; H04L 67/06; H04L 67/34
(Continued)

(56) References Cited

U.S. PATENT DOCUMENTS 5,367,698 A * 11/1994 Webber ............. G06F 17/30079
707/E17.01
6,523,166 B1    2/2003 Mishra et al.
(Continued)

FOREIGN PATENT DOCUMENTS

| TW | 2012/02976 | 1/2012 |
| TW | 2012/14284 | 4/2012 |
| WO | 2011/047074 | 4/2011 |

OTHER PUBLICATIONS

International Search Report and Written Opinion from PCT Application No. PCT/US2013/039773 mailed Jul. 31, 2013.
(Continued)

*Primary Examiner* — Frantz Jean
(74) *Attorney, Agent, or Firm* — Polsinelli LLP

(57) ABSTRACT

A cloud computing system can be used to transparently reduce the storage space of an application on a client device. An application can be installed with a minimal set of application resource files. The remaining application resource files can be replaced with application resource file placeholders, which can have the appearance of application resource files but are in fact empty files. When an application requests an application resource file, an application resource file retrieval process installed on the client device can detect the difference between an application resource file and an application resource file placeholder. The application resource file retrieval process can trigger a fault in response to detecting an application resource file placeholder, which causes the client device to obtain the requested application resource file from a remote storage location, such as cloud-based storage. Additionally, installed application resource files can be replaced with application resource file placeholders.

20 Claims, 19 Drawing Sheets

(52) U.S. Cl.
CPC ........ *H04L 67/1097* (2013.01); *H04L 67/125* (2013.01); *H04L 67/34* (2013.01); *G06F 9/44521* (2013.01)

(58) Field of Classification Search
USPC ...... 709/203, 217; 717/173–178; 726/22, 28
See application file for complete search history.

(56) References Cited

U.S. PATENT DOCUMENTS

| | | | |
|---|---|---|---|
| 7,228,540 B2 * | 6/2007 | Chan | G06F 9/445 717/168 |
| 8,046,331 B1 | 10/2011 | Sanghavi et al. | |
| 8,595,243 B1 | 11/2013 | Gunda | |
| 8,782,053 B2 | 7/2014 | Raanan et al. | |
| 2010/0030791 A1 | 2/2010 | Iverson et al. | |
| 2010/0107091 A1 * | 4/2010 | Amsterdam | G06F 17/3089 715/760 |
| 2011/0225576 A1 * | 9/2011 | Guedalia | G06F 17/30194 717/175 |
| 2012/0047239 A1 | 2/2012 | Donahue et al. | |
| 2012/0310762 A1 * | 12/2012 | Robbin | G06F 21/10 705/26.1 |
| 2012/0323868 A1 * | 12/2012 | Robbin | G06F 17/30194 707/695 |
| 2013/0061335 A1 * | 3/2013 | Schwabe | G06F 21/6218 726/28 |
| 2013/0117365 A1 | 5/2013 | Padmanabhan et al. | |
| 2014/0344246 A1 * | 11/2014 | Raanan | G06F 9/445 707/718 |

OTHER PUBLICATIONS

International Preliminary Report from PCT Application No. PCT/US2013/039773 mailed Nov. 27, 2014.

* cited by examiner

CLOUD-BASED APPLICATION RESOURCE FILES

CROSS-REFERENCE TO RELATED APPLICATIONS

This application is a Continuation of U.S. patent application Ser. No. 13/473,560, filed on May 16, 2012, now U.S. Pat. No. 9,086,937 issued on Jul. 21, 2015, of which is hereby incorporated by reference herein in its entirety.

BACKGROUND

1. Technical Field

The present disclosure relates to cloud computing and more specifically to using cloud-based storage to transparently reduce the space requirements of an application installed on a client device.

2. Introduction

Many applications installed on a client device include functionality that requires the use of assets or resources that are external to the main application executable, such as through a template file, a library file, a data file, another application, a daemon, etc. For example, a word processing program can include a main application executable that provides the core functionality. To provide specialized functionality, such as specially designed document formatting that a user can reuse, the word processing program can include templates. When a user chooses to use a predefined document format, the corresponding template is loaded from an external resource file.

The full set of application resource files included with an application can be designed to cover a broad application usage spectrum and the majority of users may only make use of a subset of the application resources. For example, word processing applications often include a plethora of templates targeting a range of use cases, including personal and business use. A user who installs a word processing application for personal use has a lower likelihood of using the business related templates than the templates designed for the personal use cases. Additionally, in some cases, a user may never use a single template or may only use personally created templates. The templates that are never used occupy space on the user's device that could be used to store data actually used by the user.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The presently disclosed technology enables the transparent reduction of the space occupied by an application on a client device by storing application resource files in remote storage, such as cloud-based storage. A method includes receiving a request to install an application. The application can be any application that includes one or more application resource files. In some cases, the request can be received by the operating system or a special process or daemon configured to install applications that include application resource files.

In response to receiving the install request, the method can select at least one application resource file to install as an application resource file placeholder. In some cases, the application resource file placeholder can have the appearance of the application resource file that it is replacing. Additionally, the method can select the application resource files that are to be installed as application resource file placeholders based on a predefined criteria, such as application resource file size, maximum total size of installed application resource files for the application, the target application use, and/or application use history. An application resource file that is installed as an application resource file placeholder can be stored in a remote repository, such as cloud-based storage.

A second method includes receiving a request from an executing application for an application resource file. The executing application can be any application including an operating system installed with a minimal set of application resource files. In some cases, the request can be received by the operating system or a special process or daemon designed to retrieve application resource files.

The method can detect a fault in response to identifying that the requested application resource file is an application resource file placeholder. In some cases, an application resource file placeholder is spoofed to have the appearance of an application resource file. That is, the application resource file placeholder and application resource file can have the same name, file type, and displayed size, however, the actual size of the application resource file placeholder can be 0 bytes or the file can be empty. In this case, detecting that an application resource file is an application resource file placeholder can include identifying that a specific bit is set on the file. In response to the fault, the method can obtain the requested application resource file from a remote storage location, such as a cloud computing system, cloud-based storage, another client device, or a peer-computing device. In some cases, the application resource file placeholder can be replaced with the obtained application resource file.

In some embodiments, the method can further include replacing an installed application resource file with an application resource file placeholder. The replacement can occur in response to satisfying predefined criteria. The predefined criteria can include determining that the application resource file is no longer needed or that additional space is required on the client device.

A system includes a memory, such as a hard drive that can store an application, application resource files, and application resource file placeholders. The system can also include a first module configured to control the processor to receive a request for an application resource file, such as a template file. In some cases, the first module can be an application resource file retrieval process, such as a daemon or other application.

Upon receiving a request for an application resource file, a second module can attempt to retrieve the application resource file. When second module detects an application resource file placeholder, the second module can trigger a fault. In some cases, the second module can detect an application resource file placeholder through a specific bit set on the file. In response to the fault, the second module can obtain the requested application resource file from a remote repository, such as cloud-based storage. In some cases, the second module can obtain the requested application resource file by causing the system to obtain the requested application resource file. Furthermore, the a third module can replace the application resource file placeholder with the obtained application resource file.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure addresses the need in the art for improved methods of sharing and storing data in a cloud-based computing environment.

1. Cloud Computing Environment Overview

Figure 1:
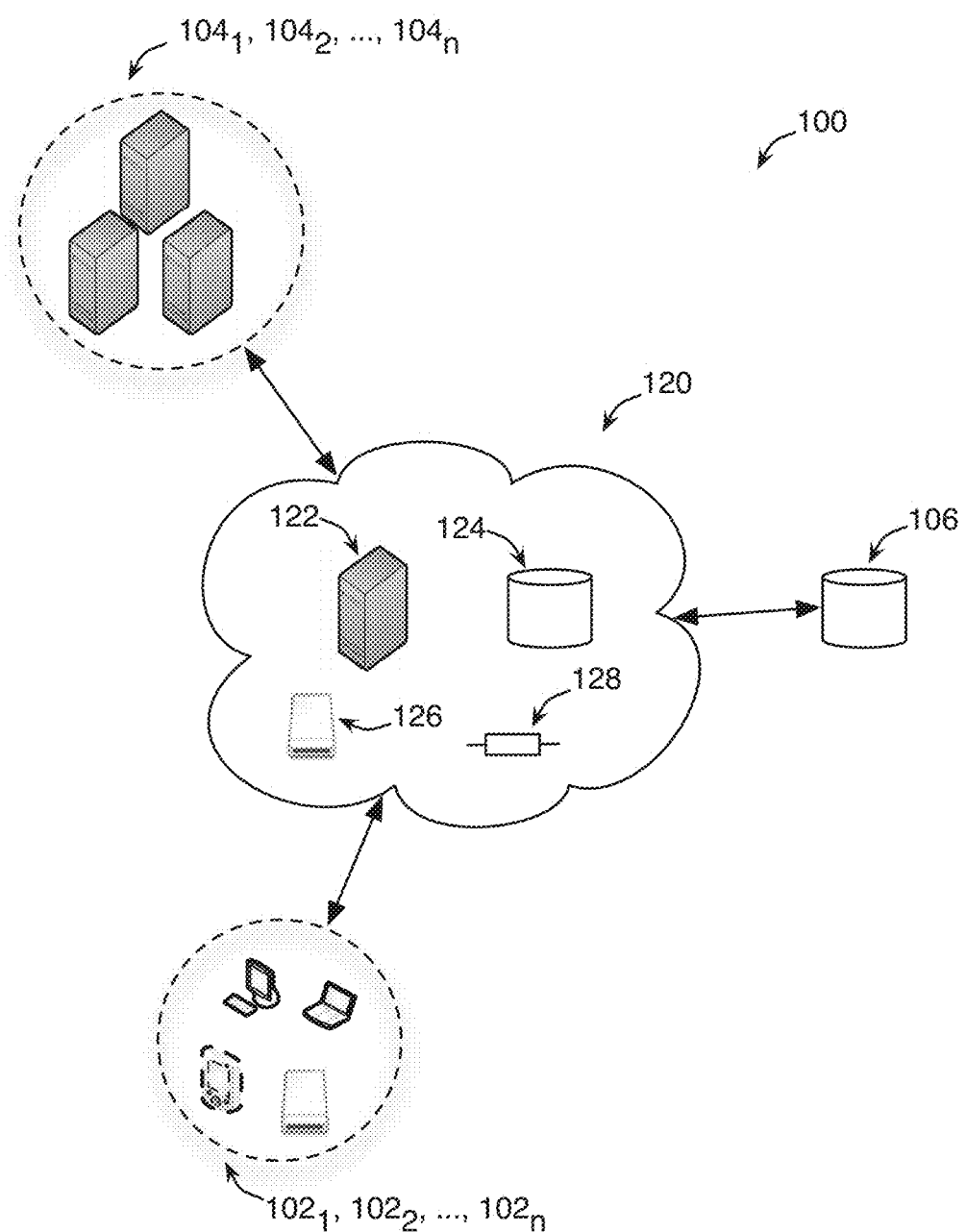
FIG. 1 illustrates an exemplary configuration of devices in a cloud computing system.

Cloud computing is a type of Internet-based computing in which a variety of resources are hosted and/or controlled by an entity and made available by the entity to authorized users via the Internet. An exemplary cloud computing system configuration 100 is illustrated in FIG. 1 wherein a variety of electronic devices can communicate via a network for purposes of exchanging content and other data. The system can be configured for use on a wide variety of network configurations that facilitate the intercommunication of electronic devices. For example, each of the components of system 100 in FIG. 1 can be implemented in a localized or distributed fashion in a network.

System 100 can be configured to include cloud computing resources 120. The cloud resources can include a variety of hardware and/or software resources, such as cloud servers 122, cloud databases 124, cloud-based storage 126, cloud networks 128, cloud applications, cloud platforms, and/or any other cloud-based resources. In some cases, the cloud resources are distributed. For example, cloud-based storage 126 can include multiple storage devices. In some cases, cloud resources can be distributed across multiple cloud computing systems and/or individual network-enabled computing devices. For example, cloud computing resources 120 can communicate with servers $104_1$, $104_2$, . . . , $104_n$ (collectively "104"), database 106, and/or any other network-enabled computing device to provide the cloud resources.

Furthermore, in some cases, the cloud resources can be redundant. For example, if cloud computing resources 120 is configured to provide data backup services, multiple copies of the data can be stored such that the data is still available to the user even if a storage resource is offline, busy, or otherwise unavailable to process a request. In another example, if cloud computing resources 120 is configured to provide applications, the applications can be available from different cloud servers so that the applications can be served from any of the different cloud servers. Algorithms can be applied such that the closest server or the server with the lowest current load is selected to process a given request.

In system 100, a user interacts with cloud computing resources 120 through user terminals $102_1$, $102_2$, . . . , $102_n$ (collectively "102") connected to a network by direct and/or indirect communication. Cloud computing resources 120 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 120 can concurrently accept connections from and interact with multiple electronic devices. Interaction with the multiple electronic devices can be prioritized or occur simultaneously.

Cloud computing resources 120 can provide cloud resources through a variety of deployment models, such as public, private, community, hybrid, and/or any other cloud deployment model. In some cases, cloud computing resources 120 can support multiple deployment models. For example, cloud computing resources 120 can provide one set of resources through a public deployment model and another set of resources through a private deployment model.

In some configurations, a user terminal 102 can access cloud computing resources 120 from any location where an Internet connection is available. However, in other cases, cloud computing resources 120 can be configured to restrict access to certain resources such that a resource can only be accessed from certain locations. For example, if cloud computing resources 120 is configured to provide a resource using a private deployment model, then cloud computing resources 120 can restrict access to the resource, such as by requiring that a user terminal 102 access the resource from behind a firewall.

Cloud computing resources 120 can provide cloud resources to user terminals 102 through a variety of service models, such as Software as a Service (SaaS), Platforms as a service (PaaS), Infrastructure as a Service (IaaS), and/or any other cloud service models. In some cases, cloud computing resources 120 can provide multiple service models to a user terminal 102. For example, cloud computing resources 120 can provide both SaaS and IaaS to a user terminal 102. In some cases, cloud computing resources 120 can provide different service models to different user terminals 102. For example, cloud computing resources 120 can provide SaaS to user terminal $102_1$ and PaaS to user terminal $102_2$.

In some cases, cloud computing resources 120 can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources 120 such as servers 104 or database 106.

Cloud computing resources 120 can provide a variety of functionality that requires user interaction. Accordingly, a user interface (UI) can be provided for communicating with cloud computing resources 120 and/or performing tasks associated with the cloud resources. The UI can be accessed via an end user terminal 102 in communication with cloud computing resources 120. The UI can be configured to operate in a variety of client modes, including a fat client mode, a thin client mode, or a hybrid client mode, depending on the storage and processing capabilities of cloud computing resources 120 and/or the user terminal 102. Therefore, a UI can be implemented as a standalone application operating at the user terminal in some embodiments. In other embodiments, a web browser-based portal can be used to provide the UI. Any other configuration to access cloud computing resources 120 can also be used in the various embodiments.

2. Cloud Computing Resources System

Figure 2:
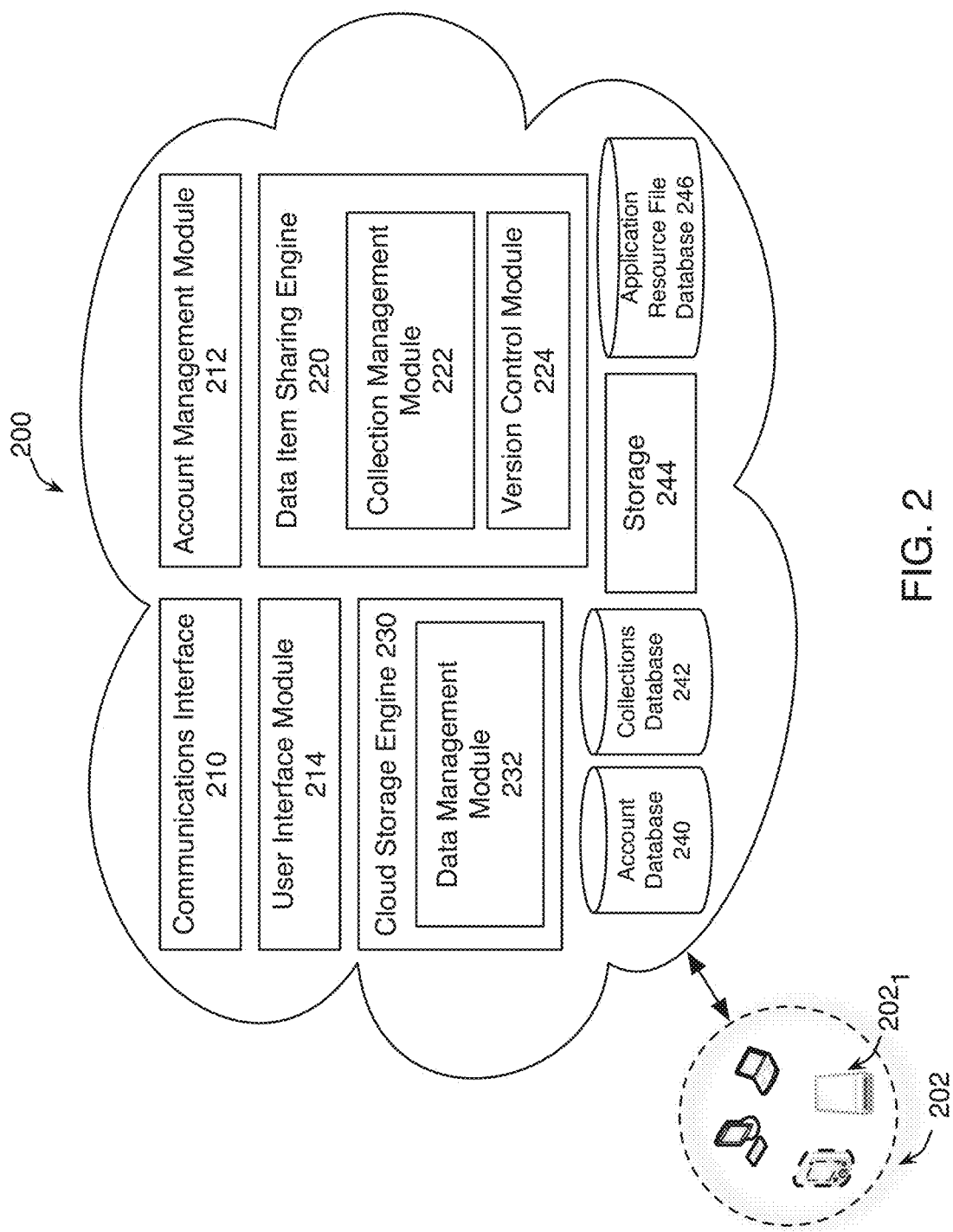
FIG. 2 illustrates an exemplary cloud computing resources system.

Having disclosed an exemplary cloud computing environment, the disclosure now turns to FIG. 2, which illustrates an exemplary cloud computing resources (CCR) system 200, such as cloud computing resources 120 in FIG. 1. The CCR system 200 can include a number of features to enhance a user's ability to store, share, and access data from a variety of different client device types. The features can include enhanced cloud-based storage, cloud-based resource, and group data item sharing and collaboration. For example, CCR system 200 can provide cloud-based storage that is extended through the use of an external network storage device, such as a personal network-enabled external hard drive. In another example, CCR system 200 can provide cloud-based storage for application resource files, such as template files that are infrequently used. In yet another example, CCR system 200 can facilitate data sharing among a group of users subscribed to a collection. These features, as well as, the architecture and resources that can be used to provide the features will be discussed in greater detail below.

2.1 Architecture

As illustrated in FIG. 2, the architecture of the CCR system 200 can contain a number of components. The components can include one or more databases for storing data relevant to the operation of the system, e.g., an account database 240, a collections database 242, and an application resource database 246; one or more storage device, e.g., cloud-based storage 244; and one or more modules and/or engines for interacting with the databases, storage devices, and/or controlling the features provided by the system, e.g., a communications interface 210, an account management module 212, a user interface module 214, a data item sharing engine 220, and a cloud storage engine 230. Each of components in FIG. 2 is discussed in more detail below; however, it should be understood to one skilled in the art, that the architectural configuration illustrated in FIG. 2 is simply one possible configuration and that other configurations with more or less components are also possible.

The CCR system 200 is network-based system that can communicate with a variety of different client devices. To facilitate the communication, the CCR system 200 can include a communications interface 210. The communications interface 210 can be configured to receive a communication, such as a request, data, etc., from a client device and pass the communication along to the appropriate module and/or engine in the CCR system 200 for processing. The communications interface 210 can also be configured to send a communication to a client device. Furthermore, the communications interface 210 can be configured to communicate with any computing device including other cloud computing systems.

Some of the features provided by the CCR system 200 can require user interaction, such as a request for a specific file that is stored in cloud-based storage, inviting a new user to subscribe to a data file collection, and/or adding a new file to a collection. Accordingly, a user interface (UI) can be provided for communicating with a user interface module 214 for performing such tasks. The UI for the user interface module 214 can be accessed via a client device 202 in communication with the CCR system 200. The UI and the user interface module 214 can operate in a variety of client modes, include a fat client mode, a thin client mode, or a hybrid client mode, depending on the storage and processing capabilities of the CCR system 200 and/or the client device 202. Therefore, a UI for the user interface module can be implemented as a standalone application operating on a client device in some embodiments. In other embodiments, a web browser-based portal can be used to provide the UI for the user interface module 214. Any other configuration to remotely or locally access the CCR system 200 can also be used in the various embodiments. Additionally, the UI can be any type of UI that facilitates user interaction, such as a graphical user interface, an audio user interface, and/or any other type of UI.

In some cases, the CCR system 200 can provide features on a per user basis, such as cloud-based storage, or a feature may require user authentication. To enable these features, the CCR system 200 can include an account database 240 and an account management module 212. The information stored in the account database can vary depending on the feature. For example, if the account database 240 is used to store information related to enhanced cloud-based storage, the account information may include user information, maximum storage space authorized, storage space used, identifiers of authorized client devices, identifiers of authorized external network storage devices, file storage locations, etc. Alternatively, if the account database 240 is used to store information related to data file collections, the account information may include user information, collections subscribed to, identifiers of authorized client devices, etc. In some configurations, a single account database can be used across the CCR system 200 to store account information for all of the features. However, the CCR system 200 can be configured to maintain different account databases for different features, such as an account database for cloud-based storage and a different account database for data file collections.

The account management module 212 can be configured to update and/or obtain user account details in the user account database 240. For example, upon receiving a request to store a file, the account management module 212 can obtain the user's account details, which the CCR system 200 can then use to determine whether the user has authorized an external network storage device as a storage location. In another example, in response to a user accepting an invitation to subscribe to a collection, the account management module 212 can update the user's account details to include the collection. The account management module 212 can be configured to interact with any number of other modules and/or engines in the CCR system 200.

One of the features of the CCR system 200, which will be discussed in more detail below, is that the CCR system 200 can be used to facilitate data item sharing and collaboration among groups of users. The sharing and collaboration can be accomplished through the creation of collections. A group of users can subscribe to a collection. After a collection has been formed, one or more subscribed users can assign data items to the collection, and a copy of each assigned data item can be distributed to each subscribed user. Information related to a collection can be stored in the collections database 242. The stored information can include a collection identifier, identifiers of subscribed users, assigned data items, one or more log files maintaining a record of modifications, etc.

The CCR system 200 can include a data item sharing engine 220 to manage the sharing and collaboration activities associated with collections. For example, the data item sharing engine 220 can receive a modification to a data item assigned to a collection, update the collection information in the collection database 242, and distribute the modification to the other users subscribed to the collection. To accomplish the task of managing the sharing and collaboration activities associated with collections, the data item sharing engine 220 can include one or more modules, such as a collection management module 222 and a version control module 224. The data item sharing engine 220 can also be configured to interact with any number of other modules and/or engines in the CCR system 200.

Another feature of the CCR system 200, which will be discussed in more detail below, is that the CCR system 200 can provide enhanced cloud-based storage. To facilitate the enhanced cloud-based storage, the CCR system 200 can include a cloud storage engine 230. For example, the cloud storage engine 230 can receive a request to store a data item. In response to the store request, the cloud storage engine 230 can obtain user account details associated with the request, store the data item in cloud-based storage 244 and/or on an authorized external network storage device, and update the account details regarding the storage location. Likewise, the cloud storage engine 230 can receive a request to retrieve a data item. In response to the retrieve request, the cloud storage engine 230 can obtain user account details associated with the request to identify the storage location, and obtain the data item from the storage location. Additionally, the cloud storage engine 230 can be used to manage the storage and retrieval of application resource files, such as template files. The cloud storage engine 230 can include one or more modules, such as a data management module 232, and one or more databases, such as the application resource database 246, to provide the cloud-based application resources functionality. The cloud storage engine 230 can also be configured to interact with any number of other modules and/or engines in the CCR system 200.

2.2 Features

As mentioned previously, the CCR system 200 can include a number of features to enhance a user's ability to store, share, and access data from a variety of different client device types. The features can include enhanced cloud-based storage, cloud-based resources, and group data sharing.

2.2.1 Enhanced Cloud-Based Storage

The CCR system 200 can be configured to provide cloud-based storage. In some configurations, the cloud storage engine 230 can manage the cloud-based storage feature. The cloud storage engine can receive store requests and retrieve requests from client devices. In some cases, the store and retrieve requests are passed to the cloud storage engine 230 via the communications interface 210 and/or the user interface module 214.

A user can establish an account with the CCR system 200 for the purpose of storing data items from a client device in cloud-based storage, such as cloud-based storage 244. The cloud storage engine 230 can obtain the account details, such as from the account management module 212. In some cases, the cloud storage engine 230 can assign a maximum storage capacity for a user account. For example, the cloud storage engine 230 can assign uniform storage capacities for all users, e.g. 4 GB. In another example, the cloud storage engine 230 can assign different storage capacities for different users based on predefined criteria, e.g. capacity based on user affiliation, capacity based on subscription fee, etc. The maximum storage capacity can be recorded in a user's account details, such as by passing the information to the account management module 212. However, in some cases, the cloud storage engine 230 can allow unlimited storage capacity.

In addition to storage capacity, the cloud storage engine 230 can also be configured to maintain a record of a user's current storage usage. For example, if a user has stored five files that have a total size of 500 MB, the cloud storage engine 230 can maintain such information by having the information recorded in the user's account details. In some cases, usage information can be maintained regardless of whether a maximum storage capacity is assigned to a user.

The cloud storage engine 230 can also be configured so that a user can authorize multiple client devices on a single user account, thus allowing a user to access a data item stored in cloud-based storage from multiple client devices. For example, a user can authorize a home desktop computer and a portable computer. The user can then store a data item from the desktop computer to the cloud-based storage and later retrieve the item using the portable computer. The authorized client devices can be recorded in the user's account details, such as by recording a unique identifier for a client device. Additionally, in some cases, a client device can be associated with multiple user accounts.

The cloud-based storage details described thus far are rather traditional cloud-based storage features. However, the cloud storage engine 230 can provide enhanced cloud-based storage through integration of an external network storage device authorized on a user account. An external network storage device as used herein can be any network-enabled storage device, such as an external hard drive, that the user owns and/or that is connected to the CCR system 200 via the user's local network, e.g. personal network storage device $202_1$. That is, a network-enabled storage device that is independent of any cloud computing system. For example, an external network storage device can be an external hard drive a user has connected to their local network in their home. Alternatively, an external network storage device can be a network-enabled storage device connected to an organization's local network. That is, an external network storage device can be any network-enabled storage device residing on a local network, as opposed to being part of the CCR system 200 or some other cloud computing system.

A user can authorize one or more external network storage devices on their user account in the CCR system 200. In some cases, an external network storage device can be authorized on multiple user accounts. For example, a household may include three people, each with user accounts, and a single external network storage device. Each user in the household can authorize the external network storage device on their account.

Once an external network storage device is authorized in a user account, the cloud storage engine 230 can use the external network storage device to extend the cloud-based storage. That is, instead of storing a data item in cloud-based storage 244, the cloud storage engine 230 can store the data item on the authorized external network storage device. However, if a user requests to store a data item, and the user has not authorized an external network storage device on their account, the cloud storage engine 230 can revert to traditional cloud-based storage.

When multiple external network storage devices are authorized in a user account, the cloud storage engine 230 can select one of the external network storage devices as the storage location for a data item. The selection can be based on a variety of criteria, such as random, the amount of space available, distance from the cloud storage engine 230, data item type, user preference, reliability of the external network storage device, etc.

The cloud storage engine 230 can be configured to include a data management module 232 that can administer the data items stored in cloud-based storage. For example, the data management module 232 can operate as an enhanced file system. The data management module 232 can be configured to determine whether a data item should be stored in cloud-based storage 244 or on an authorized external network storage device. The decision to store a data item on an authorized external network storage device can be based on satisfying predefined criteria. The criteria used can vary with the configuration of the system. In some cases, the data management module 232 can choose to store a data item on an authorized external network storage device when it is determined that not enough space was allocated in cloud-based storage for the user. For example, the cloud storage engine 230 can be configured to allocate less space than the approved maximum capacity for a user account. When the data management module 232 determines that the space allocated is insufficient, and the user has not exceeded the user's approved maximum storage capacity, instead of allocating more space in cloud-based storage 244, the data management module 232 can store the data item on the authorized external network storage device. In some cases, the data management module 232 can choose to store a data item on an authorized external network storage device when it is determined that the user has exceeded the user's approved maximum storage capacity. For example, instead of denying the user's storage request or requiring the user to increase their storage capacity in the cloud-based storage 244, the data management module 232 can store the data item on an authorized external network storage device. Alternatively, in some cases, the data management module 232 can be configured to choose to store a data item on an authorized external network storage device when the data management module 232 determines that storing on the external network storage device may be more efficient. For example, if the external network storage device is closer than the cloud-based storage 244, storing the data item on the external network storage device can reduce the latency and increase performance. Additionally, in some cases, the data management module 232 can be configured to choose to store a data item on an authorized external network storage device based on user preference. For example, a user can specify that a particular data item or a particular type of data item should be stored on the external network storage device.

The data management module 232 can also be configured to maintain multiple copies of a data item in cloud-based storage 244. The redundancy can be performed to decrease the likelihood that a requested data item is unavailable. For example, the data management module 232 can be configured to store a copy of a data item in cloud-based storage 244 every time the data item is stored on an external network storage device. In some cases, the redundancy options can be based on user preference. For example, the user can specify that a data item that the user instructed the cloud storage engine 230 to store on an external network storage device should not also be stored in cloud-based storage 244, but can be stored on an additional authorized external network storage device.

In some cases, the data management module 232 can be configured to split the data item and store the pieces in one or more cloud-based storage locations, including on an external network storage device. For example, a data item can be split into two pieces and one piece stored in cloud-based storage 244 and the other on an external network storage device. Additionally, in some configurations, the data management module 232 can split the data item into multiple pieces and redundantly store the pieces.

Figure 3:
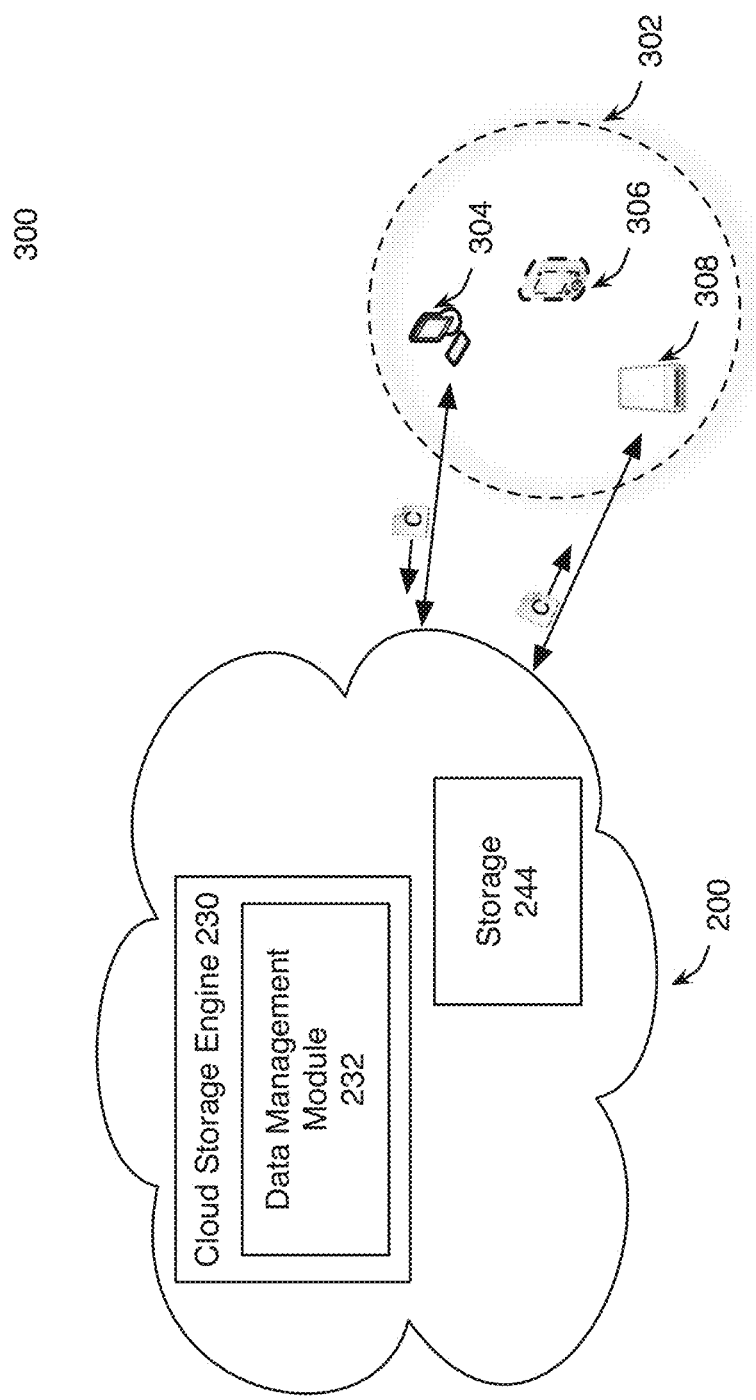
FIG. 3 illustrates an exemplary request to store a data item using enhanced cloud-based storage.

FIG. 3 illustrates an exemplary scenario 300 in which a request to store a data item using enhanced cloud-based storage is received at the CCR system 200. In the scenario 300, a user 302 has an assortment of client devices 304, 306, and 308. The user has authorized client devices 304 and 306 on the user's account for the purpose of sending to and retrieving data items from cloud-based storage. Additionally, the user has authorized external network storage device 308 as an authorized storage location for the user's data items. When the user makes a store request from client device 304, the cloud storage engine 230 receives the request and the data item. Upon determining that the data item should be stored on an external network storage device 308, the cloud storage engine 230 can send the data item to the external network storage device 308 and update the user's account details to reflect the storage location choice. The cloud storage engine 230 can make the determination that the data item should be stored on the external network storage device 308 in a manner that is transparent to the user. That is, the cloud storage engine 230 can chose to store the data item on the external network storage device 308 without input from the user.

Figure 4:
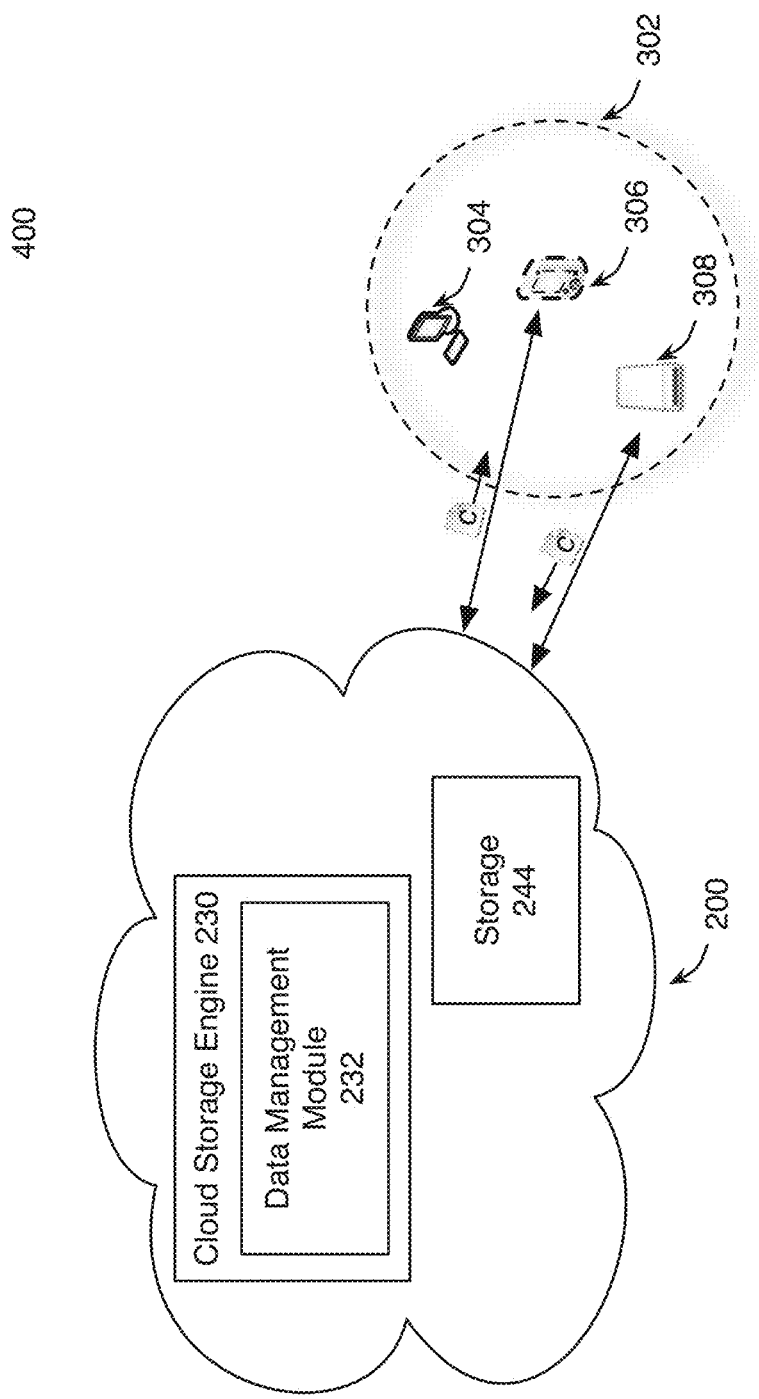
FIG. 4 illustrates an exemplary request to retrieve a data item using enhanced cloud-based storage.

FIG. 4 illustrates an exemplary scenario 400 in which the user 302 requests to retrieve a data item previously stored in the cloud-based storage. In the scenario 400, the user makes a request to retrieve the data item. The request to retrieve a data item can be made from the same client device that was used to store the data item and/or from a different device. In scenario 400, the retrieve request is made from client device 306, which is a different device than was used to store the data item. In response to receiving the request, the cloud storage engine 230 obtains the user account information to determine the location of the data item. Upon determining that the data item was stored on an external network storage device, the cloud storage engine 230 can obtain the data item from the external network storage device 308 and send the data item to the client device 306. Because the storage location information is maintained by the CCR system 200, the cloud storage engine 230 can obtain a data item stored on an external network storage device without additional input from the user. Therefore, the fact that a data item is stored on an external network storage device can be transparent to a user.

2.2.2 Cloud-Based Resources

The CCR system 200 can also be configured to provide a client device with cloud-based application resources and/or facilitate the retrieval of application resources from other storage locations. In many cases, an application executing on a client device can include functionality that requires the use of assets or resources that are external to the main application executable. The application resource can include any resource required by the application to provide some aspect of the application's functionality, e.g. a template file, a library file, a data file, another application, a daemon, etc. For example, a word processing program can include a main application executable that provides the core functionality. To provide specialized functionality, such as specially designed document formatting that a user can reuse, the word processing program can include templates. When a user chooses to use a predefined document format, the corresponding template is loaded from an external resource file. In this example, each template is an application resource. In another example, a music application can include a collection of different instruments. Each instrument can be an application resource. The functionality for the instrument can be contained in an application resource file, which is loaded by the music application when the user chooses that particular application. In yet another example, an application can be an operating system that includes a kernel, which provides the most basic functionality and allows other applications to interact with a device's hardware. To provide higher-level functionality, an operating system can include other resources in the form of other applications and daemons, many of which are executed on an as needed basis. Each of the higher-level applications and daemons are application resources for the operating system. From the perspective of the kernel, the higher-level functionality is provided through application resource files.

Figure 5:
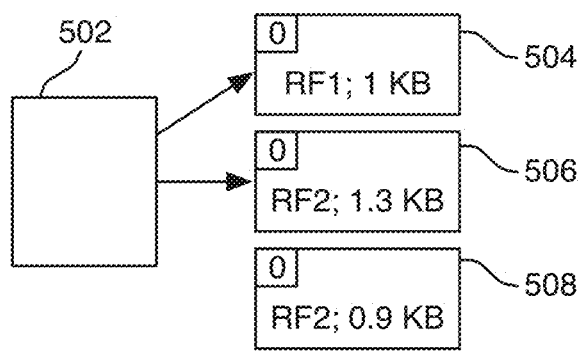
FIG. 5 illustrates an exemplary application with application resource files.

FIG. 5 illustrates an exemplary scenario 500 of an application with application resource files. In scenario 500, the application 502 includes three application resource files 504, 506, and 508. As the application 502 executes, the application resource files are loaded. In scenario 500, resource files 504 and 506 have been loaded, but resource file 508 has not.

The full set of application resource files included with an application can be designed to cover a broad application usage spectrum and a majority of users may only make use of a subset of the application resources. For example, word processing applications often include a plethora of templates targeting a range of use cases including personal and business use. A user who installed a word processing application for personal use has a lower likelihood of using the business related templates than the templates designed for personal use cases. Additionally, in some cases, a user may never use a single template or may only use personally created templates. The templates that are never used occupy space on the user's device that could be used to store data actually used by the user. Therefore, to decrease the storage footprint of an application, the application can be installed on a client device with only a minimal set of application resource files or even no application resource files at all.

The set of application resource files installed with the application can vary with the configuration, can be determined by the application developer, and/or can be determined by the user. For example, an application developer can maintain application usage history information. Based on the usage history information, the developer can determine that a particular subset of application resource files are most frequently used and only include those resource files with the application. In another example, the application installation can be configured to allow the user to specify a subset of application resource files to install, such as resource files categorized for a particular use case or a particular type of assets, e.g. home or business. In yet another example, a client device can be configured to automatically only install a subset of the applications based on a predefined criteria, such as resource file size or a maximum total size for all installed application resource files.

In place of an application resource file, an application can include an application resource file placeholder. An application resource file placeholder can provide the appearance that the actual application resource file is installed, but instead it is actually an empty file that is spoofed to look identical to the actual resource file. That is, an application resource file placeholder can have the same name, type, etc. It can even display a file size that matches the size of the actual resource file, which can be a safety measure to prevent accidental deletion of the placeholder file. Where a placeholder can differ from an actual resource file is that the placeholder contains no data and a special bit can be set to indicate that the file is placeholder.

To facilitate the retrieval of an application resource file, an operating system installed on the client device can include a special resource file fetching process or daemon. When an application resource file is requested by an application, the resource file fetching process can receive the request and then detect, through the special bit, whether the installed resource file is an actual resource file or a placeholder. If the process detects a placeholder file, a fault is triggered and the actual resource file is obtained from the cloud. Once the actual resource file is obtained, it can be installed in place of the resource file placeholder. Because a separate process is responsible for providing the resource file to the requesting application, whether an actual resource file or a placeholder is installed can be transparent to the application. This level of transparency also means that no special application preparation is required. That is, the application itself does not need to include special functionality for fetching a resource file and/or the application developer does not need to identify and replace pieces of the program with resource file placeholders. The installation of placeholder files can occur at any time, including after a resource file has been installed.

Figure 6:
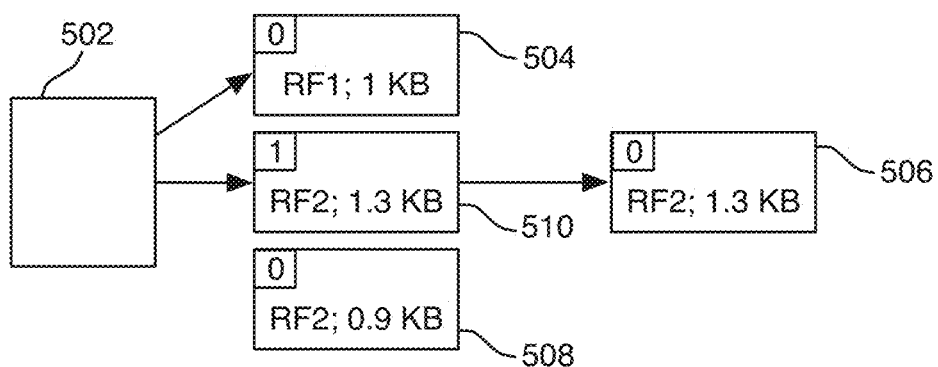
FIG. 6 illustrates an exemplary application with application resource files and an application resource file placeholder.

FIG. 6 illustrates an exemplary scenario 600 of an application with application resource files and an application resource file placeholder. In scenario 600, the application 502, from FIG. 5, still includes functionality provided by the three application resource files, but now application 502 is installed with only two of the application resource files: resource files 504 and 508. In place of application resource file 506, the application includes an application resource file placeholder 510. As the application 502 executes, the application resource files are loaded. When the application resource file placeholder 510 is encountered the client device obtains the actual application resource file.

Figure 7:
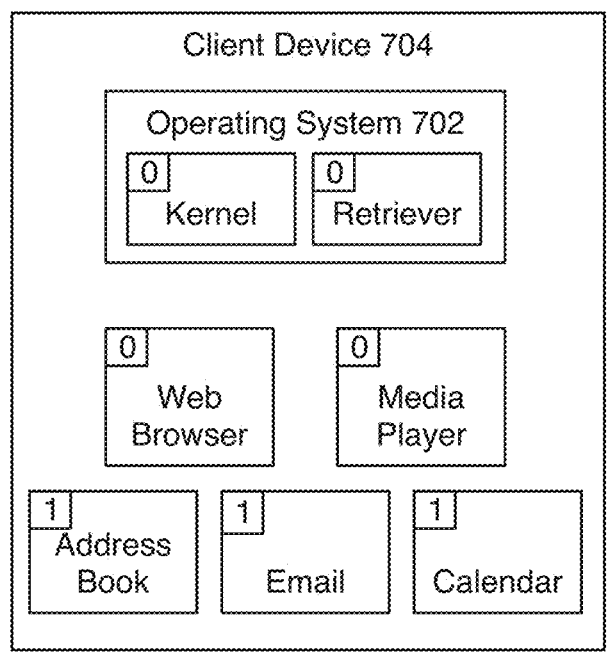
FIG. 7 illustrates an exemplary operating system with resource files and resource file placeholders.

FIG. 7 illustrates another exemplary scenario 700 of an operating system 702 installed on a client device 704 with resource files and resource file placeholders. The operating system 702 can be installed on a client device 704 with minimal functionality that includes the kernel and the resource file retrieval daemon. A minimal set of additional functionality can also be installed on the client device 704. For example, commonly used applications, such as a web browser and a media player, can be installed, but less commonly used applications, such as a calendar application, an email client, an address book application, etc., can be installed as resource file placeholders.

If during execution of an application on a client device, a fault is triggered, the client device can communicate with the CCR system 200 to obtain the application resource file. The CCR system 200 can be configured such that the cloud storage engine 230 can manage the cloud-based application resources feature. In some cases, the communications interface 214 can receive the request and pass the request to the cloud storage engine 230 for processing.

In some cases, the CCR system 200 can be configured to maintain a set of application resource files. For example, the CCR system 200 can store the set of application resource files in cloud-based storage 244. The scope of the application resource files can vary with the configuration of the CCR system 200 and/or the application. For example, the set of application resource files maintained by the CCR system 200 for an application can include the full collection of resource files used by the application. Alternatively, the set of application resource files maintained by the CCR system 200 can include only those application resource files not included with the original application installation. That is, the application resource files available from the CCR system 200 can exclude the application resource files in the minimal set of application resource files.

The cloud storage engine 230 can be configured to include a data management module 232 that can administer the application resource files stored in cloud-based storage. In some cases, upon receiving a request for an application resource file, the data management module 232 can retrieve the application resource file from the cloud-based storage 244 and send the application resource file to the requesting client device. Alternatively, upon receiving a request for an application resource file, the data management module 232 can be configured to retrieve the application resource file from a storage location outside of the CCR system 200, such as from another cloud computing system and/or another client device. In some cases, the CCR system 200 can include an application resource database 246 that includes information regarding the application resources known to the CCR system 200, such as the storage locations of the resource files. In this case, upon receiving a request for an application resource file, the data management module 232 can access the application resource database 246 to obtain any application resource file details. If the application resource file details specify a storage location, the data management module 232 can obtain the application resource file from the specified storage location.

In some cases, the cloud storage engine 230 can be configured to restrict access to some or all of the application resource files. For example, an application resource file may only be available to registered users. By limiting access to registered users, the cloud storage engine 230 can be used to prevent access to application resource files by users that do not have authorized copies of the application. In another example, an application resource may only be available to users at a certain subscription level, e.g. home edition, professional edition, etc. To enable restricted access to application resource files, the cloud storage engine 230 can obtain user account details, such as from the account management module 212, to determine whether a requesting user is eligible to receive the requested application resource.

In some configurations, an installed application resource can automatically be replaced on a client device with an application resource file placeholder. In some cases, the replacing can be performed in a manner that is transparent to the application. The conditions under which an application resource file is removed can vary with the configuration of the client device and/or the application. In some cases, an application resource file can be selected based on: need for additional space, reaching the maximum space allocation for application resource files associated with a particular application, and/or usage patterns indicating the application resource file is no longer needed. Other methods of determining when an application resource file should be removed are also possible. Additionally, the particular application resource file selected for removal can vary with the configuration of the client device and/or the application. In some cases, the particular application resource file selected can be based on: random selection, size, usage history, user preference, and/or application developer preference. Other methods of selecting a particular application resource file for removal are also possible. Furthermore, an application resource file can be replaced at any time. That is, an application resource file can be replaced regardless of whether the application is executing or not.

Figure 8:
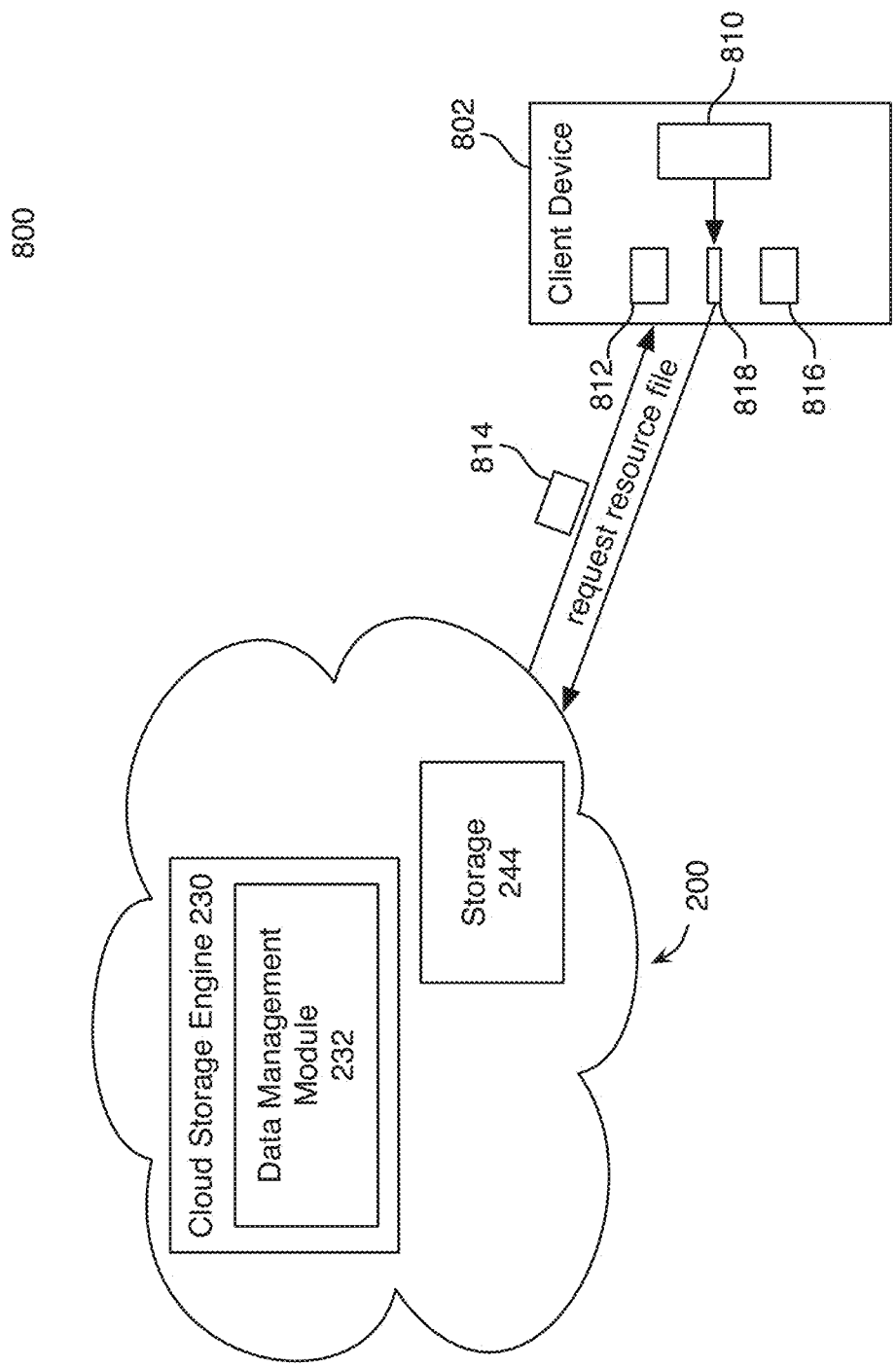
FIG. 8 illustrates an exemplary execution of an application that uses application resource files.

FIG. 8 illustrates an exemplary scenario 800 in which an application 810, which utilizes application resource files 812, 814, and 816, is executing on a client device 802. Application 810 along with application resource files 812 and 816 are installed on the client device 802. In place of application resource file 814, the application resource file placeholder 818 is installed on the client device 802. During execution, the application 810 requires application resource file 814, which triggers a fault. In response to the fault, the client device 802 communicates with the CCR system 200 to request application resource file 814. The cloud storage engine 230, via the data management module 232, retrieves the application resource file 814 from cloud-based storage, or some other storage location, and sends the application resource file 814 to the client device 802. The application resource file 814 is then installed on the client device 802.

2.2.3 Data Collections Management

Figure 9:
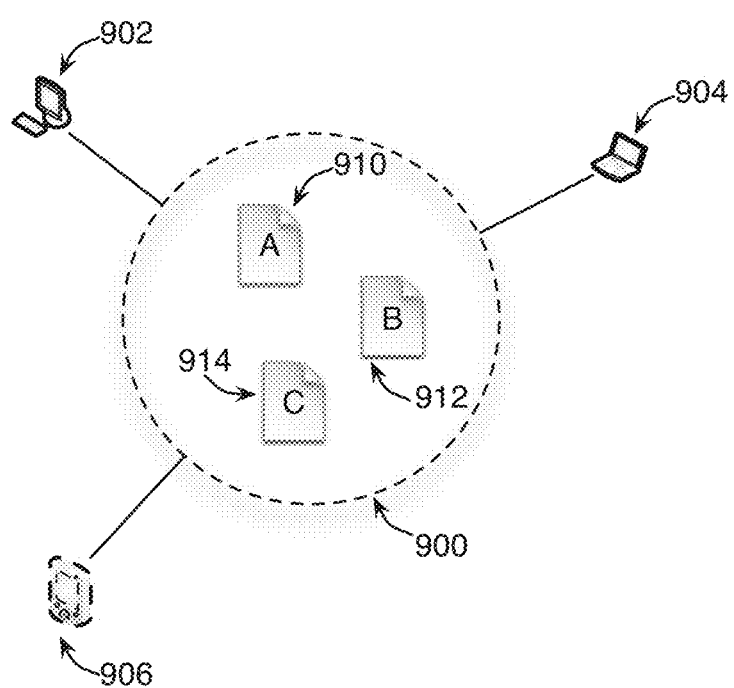
FIG. 9 illustrates an exemplary data item collection.

The CCR system 200 can also be configured to facilitate data item sharing and collaboration among groups of users. The data item sharing and collaboration feature revolves around the concept of a collection, which can unite a group of users and one or more data items. FIG. 9 provides an exemplary illustration of the collection concept. First, the collection 900 includes a group of users that are each subscribed to the collection and that can share data items with the collection via one or more authorized client devices, such as client devices 902, 904, and 906. The collection 900 also includes one or more data items that have been assigned to the collection 900, such as data items 910, 912, and 914. While the collection concept is illustrated as a group of devices accessing a central pool of data items, this is merely for the purpose of illustrating the relationship between the different aspects of a collection. In implementation, each authorized client device can maintain a local copy of each data item assigned to the collection. Additionally, a user can subscribe to multiple collections.

In some configurations, the data item sharing engine 220 can manage the various aspects of the sharing and collaboration features, such as collection formation, collection maintenance, and/or collection termination. The data item sharing engine 220 can interact with the account management module 212 and/or a collections database 242. The collections database 242 can store information related to a collection, such as a collection identifier, identifiers of subscribed users, assigned data items, one or more log files that maintain a record of data item modifications, etc. Additionally, in some configurations, the data item sharing engine 220 can communicate with a client device through the communications interface 210 and/or the user interface module 214.

In some configurations, the client device can run a client side collections application, which provides client side functionality for the data item sharing and collaboration features. The features of and the manner in which a user can interact with the client side collections application can vary with the configuration of the client device, the collections application, the CCR system 200, and/or the network connection.

An aspect of data item sharing and collaboration is collection formation. The manner in which a collection is formed can vary with the configuration of the client device, the CCR system 200, and/or the network connection. However, collection formation can include two aspects: authorization and authentication. The authorization aspect can pertain to inviting one or more users to subscribe to a collection, while the authentication aspect can pertain to validating that a user is actually authorized to subscribe to the collection.

In a method of collection formation, a user can initiate the collection formation by inviting one or more users to subscribe to the collection. In some cases, a client device can be configured such that a user can right click on the desktop to activate a menu in which one of the available menu items is "form collection," or some variation thereof. Alternatively, the client device can be configured such that a user can click on an icon or select a menu option. The client device can also be configured with an application that includes a user interface for creating one or more collections. The collections application can require the user to authenticate, such as by supplying a username and password.

The user can invite one or more users by specifying a user identifier for each user, such as a username, email address, and/or any other unique user identifier. The invitation can serve as the authorization step of the collection formation. To complete the collection formation, an invited user can authenticate, thereby subscribing the user to the collection.

In this collection formation scenario, a user can add a file to the collection after completing the subscription process. For example, the user who initiated the collection formation can add a file to the collection after inviting one or more users to subscribe, and in some cases, before all of the invited users have accepted the invitation. However, an invited user cannot add a file to the collection or receive a file that is part of a collection until the user has completed the subscription process because the user is not yet part of the collection.

Alternatively, a user can initiate collection formation by selecting one or more data items to share. In some cases, the client device can be configured such that a user can right click on a data item or a group of data items to activate a menu in which one of the available options is share. The client device can also be configured to run a client side application that includes a user interface for selecting one or more data items to share. Alternatively, a share feature can be built into an application. For example, a word processing application can include a menu item for sharing. Additionally, in some configurations, a user can select a folder containing one or more data items to share each of the data items within the folder.

After selecting to share a data item, the user can specify one or more users with whom to share the data item. The act of selecting one or more users can trigger the invitation process. The user can invite one or more users by specifying a user identifier for each user, such as a username, email address, and/or any other unique user identifier. The invitation can serve as the authorization step of the collection formation. To complete the collection formation, an invited user can authenticate, thereby subscribing the user to the collection. Even though, the collection formation was initiated by selecting a particular file to share, an invited user cannot receive the data item until the user has completed the subscription process.

Figure 10:
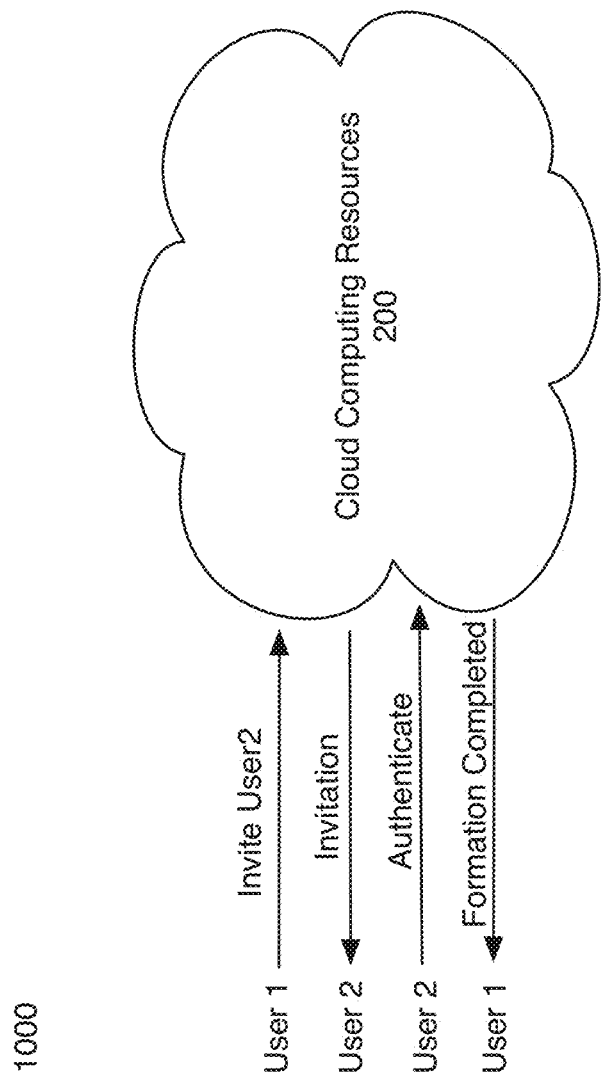
FIG. 10 illustrates an exemplary collection formation exchange.

In some cases, the CCR system 200 can act as an intermediary in the collection formation. For example, a client device can send the collection formation information to the data item sharing engine 220. Upon receiving the collection formation information, the data item sharing engine 220 can send invitations to the invited users and handle the authentication process. For example, FIG. 10 illustrates an exemplary collection formation exchange 1000 facilitated by the CCR system 200. The formation process begins with User 1, where User 1 invites User 2 to subscribe to a collection. The invitation information is sent to the CCR system 200. The CCR system 200 can then send the invitation to User 2. At some point, User 2 can act on the invitation, which requires User 2 to authenticate with the CCR system 200. Upon completion of the authentication process, the CCR system 200 can optionally send a notification to User 1 that User 2 has completed the subscription process and is now subscribed to the collection. In some cases, the invite request from User 1 can include a data item. In this case, upon completion of the authentication process, the CCR system 200 can send the data item to User 2.

The collection formation process can also be performed in a peer-to-peer configuration when the client devices are active on a local area network (LAN). For example, the collection formation process can use device discovery software, such as the Bonjour application, published by Apple Inc. of Cupertino, Calif., to discover other client devices on the LAN. An invitation to subscribe to a collection can then be sent directly from one client device to another. In a pure peer-to-peer configuration, the authentication process can be performed on the client device. Alternatively, the collection formation process can be a combination of peer-to-peer and facilitation by the CCR system 200.

The manner in which a user receives a notification can vary with the configuration of the client device, the CCR system 200, and/or the network connection. A user can receive an invitation via email, instant message, SMS, a notification in a client side application, a pop-up window on a client device, etc. For example, if a user sends invitation information to the CCR system 200 that specifies a user identifier, the CCR system 200 can maintain a database of user account information. An item in the user account information can include a method of contacting a user, such as an email address, or a phone number. The CCR system 200 can then use that information to send the invitation to the invited user. In another example, if the user sends an invitation directly to another client device on a LAN, the invited user can receive the invitation via a pop-up window on the invited user's client device.

In some cases, the types of data items that can be shared through a collection can be limited. For example, a collection can be used to share word processing documents, but not media items of a specific file type, such as movies. The limitation can be system wide and/or on a per collection basis. For example, the data item sharing engine 220 can be configured to allow the sharing of any data item type through any collection, but a particular collection can be formed with a policy that prevents sharing of data items with an AAC file type. In another example, the data item sharing engine 220 can be configured to prevent sharing of data items with an MP3 file type and then a particular collection can be formed with a policy that additionally prevents sharing of data items with an AAC file type. Thus, the resulting collection will have a policy that prevents the sharing of data items with a file type of MP3 or AAC.

In some configurations, a collection can include one or more administrators. For example, the user who formed the collection can automatically be designated the administrator. The administrator can specify policies associated with the collection, such as subscription policies, data item addition/deletion policies, data item modification policies. For example, the administrator can establish a policy that only administrators can invite new users to subscribe to the collection. In another example, the administrator can establish a policy that only administrators can add and/or delete data items from a collection. In yet another example, the administrator can establish a policy as to which users have modification rights on each data item. In a further example, an administrator can establish a policy specifying the type of data items that can be assigned to the collection. Additional, policies are also possible.

A data item can also be assigned to a collection separate from the collection formation process. In some cases, the client device can be configured such that a user can right click on a data item or a group of data items to activate a menu in which one of the available options is share. The client device can also be configured to run a client side application that includes a user interface for selecting one or more data items to share. Alternatively, a share feature can be built into an application. For example, a word processing application can include a menu item for sharing. Additionally, in some configurations, a user can select a folder to share each of the data items within the folder. After selecting to share, the user can specify one or more collections that the user is subscribed to.

In some cases, the CCR system 200 can act as an intermediary in sharing a data item. For example, once a user selects a data item to share and assigns the data item to a collection, the client device can transmit the data item to the data item sharing engine 220 along with information regarding the assigned collection. The collections management module 222, within the data item sharing engine 220, can update the collections database 242 to reflect the newly assigned data item. Additionally, in some cases, the collections management module 222 can identify the other users subscribed to the collection and distribute a copy of the data item to all authorized devices associated with the subscribed users. Alternatively, the collections management module 222 can receive requests for new data items from client devices subscribed to a collection. That is, the data item sharing engine 220 can be configured in a push and/or a pull configuration—upon receiving a new data item, the data item sharing engine 220 can push the data item to the subscribed client devices and/or the data item sharing engine 220 can receive requests from client devices for newly assigned data items. The data item sharing process can also be performed in a peer-to-peer configuration when the client devices are active on in a LAN or a hybrid configuration using a combination of peer-to-peer and facilitation by the CCR system 200.

Figure 11:
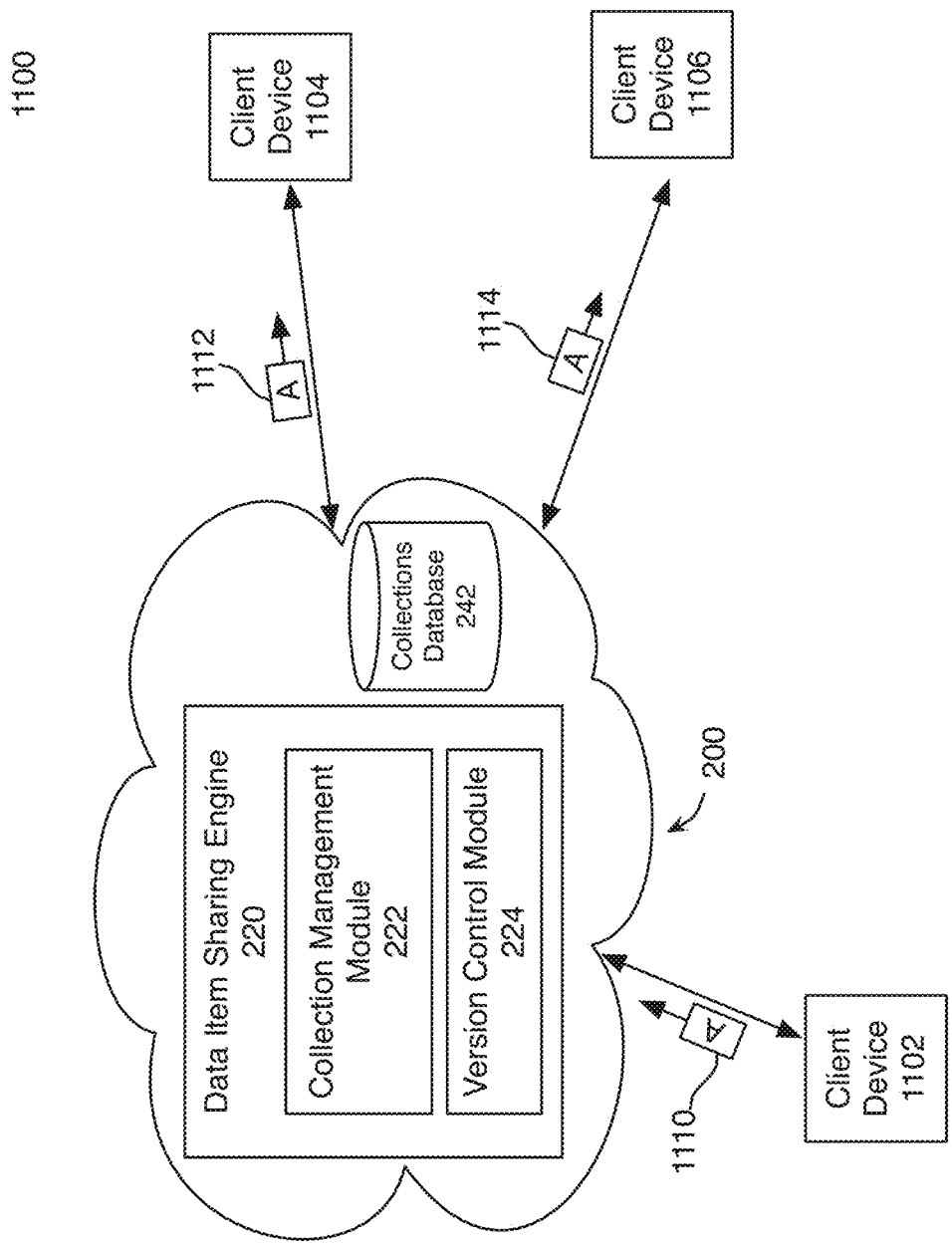
FIG. 11 illustrates an exemplary assignment of a data item to a collection.

FIG. 11 illustrates an exemplary scenario 1100 in which a data item 1110 is assigned to a collection and the distribution of the data item 1110 is facilitated by the CCR system 200. The data item 1110 is assigned to a collection on client device 1102. Once the data item 1110 is assigned, client device 1102 sends a copy of the data item 1110 to the data item sharing engine 220. The collections management module 222 updates the collections database 242. Additionally, the collections management module identifies two additional subscribed client devices 1104 and 1106 and distributes a copy of the data item, data items 1112 and 1114, to each of client devices 1104 and 1106. Upon receiving a copy of the data item, a user operating each client device can store the data item locally in a storage location of the user's choosing. That is, the user does not need to store the data item in a special folder, but can instead store the data item in a location that is meaningful to the user.

In some cases, only a subset of the users subscribed to a collection can be authorized to add data items to a collection. Such a restriction can be enforced through a number of techniques. In some cases, to enforce such a restriction, a client device can be configured to not assign a data item. Alternatively, the data item sharing engine 220 can be configured to not accept a data item assigned from an unauthorized user. Additional methods of enforcing a data item assignment restriction policy are also possible. Additionally, in some cases, a collections administrator can approve each data item or each data item assigned by specified users before the data item is officially assigned to a collection.

In addition to using a collection to share a data item, users subscribed to a collection can also collaborate on a data item assigned to the collection. That is, when a user makes a modification to a local copy of a data item assigned to the collection, the modification can automatically be distributed to every other user subscribed to the collection. In some cases, a client device can send modifications in real time. For example, the modifications can be sent as the modification is made. However, a client device can also be configured to send a collection of modifications at periodic intervals and/or send a collection of modifications upon instruction from a user. For example, a collection of modifications can be sent every 5 minutes or when the data item is saved. In another example, a collection of modifications can be sent when the user selects an options such as send modifications. Additionally, a client device can be configured to collect modifications while the client device is offline and then send all collected modifications once the client device is connected to a network.

A version control feature on the client device and/or in the data item sharing engine 220 can aid the collaboration feature. For example, the client device can be configured so that each time the user modifies a data item assigned to a collection, the client device sends the entire data item to the data item sharing engine 220 where the version control module 224 merges the changes into the current version stored in the collections database 242. To distribute the changes to the other client devices subscribed to the collection, the data item sharing engine can request the current copy of the data item on a subscribed client device, merge the modifications, and return the updated data item to the client device. Such a technique incurs significant overhead and has the potential to disrupt users on other subscribed devices. Therefore, an alternative is to configure the client device to include a client side version control application and the data item sharing engine 220 with a version control feature, such as the version control module 224. When a user modifies a data item, the client device can use the version control software to identify the changes and send only the modifications to the data item sharing engine 220. The version control module 224 can record the received modifications and distribute them to the other subscribed client devices. Once received at the other client devices, the version control software can merge the received modifications with any local changes. The modification distribution and/or the version control feature can also be performed in a peer-to-peer configuration when the client devices are active on a LAN or in a hybrid configuration using a combination of peer-to-peer and facilitation by the CCR system 200.

Each data item modification can be merged into the data item such that a client device can store a single copy of a data item assigned to the collection. In some cases, a data item modification can be distinguishable from an unmodified section or a previously modified section of a data item. For example, a client device can display a data item that is a text document, such as a word processing document, where the data item modifications are distinguished using redlining. A variety of techniques for drawing a distinction between a new modification and the previously existing data item contents are possible, such as highlighting, redlining, font changes, attaching a note or comment, etc. Additionally, in some cases, a user name or other identifier can be attached to a modification and/or displayed along side the modification.

In some cases, multiple users can modify a data item simultaneously. In this case, the data item sharing engine 220 and/or the version control software can include a conflict resolution strategy so that a client device only maintains a single copy of each data item in the collection. That is, when a conflict occurs, the conflict does not cause the creation of an additional copy of a data item on the client device. The client device can maintain a single copy of the data item where the conflicting modifications are both present in the local copy of the data item. For example, the conflicting modifications can both be merged into the local copy of the data item and a user can manually resolve the conflict, such as by selecting all or part of a modification. In some cases, the user that can resolve a conflict can be an administrator of a collection. Alternatively, a vote-based process can be used. For example, each user subscribed to the collection can select one of the conflicting modifications, the modification with the greatest number of votes can be the modification used. Alternatively, an administrator can use the voting in making a selection. In some cases, a resolution policy can be assigned to a data item or a collection. For example, the policy can specify that a conflict associated with a higher ranked user be automatically selected. Once a conflict has been resolved, the data item sharing engine 220 can distribute the resolution.

A variety of techniques can be used to present conflicting modifications in a data item. For example, conflicting modifications can be presented next to each other but be differently highlighted, such as through font or color. In another example, the conflicting modifications can be presented sequentially. In some cases, the sequentially presented modifications can be ranked, such as based on a rank assigned to the user's associated with the modifications. In yet another example, the conflicting modifications can be presented in a margin next to the original content. In a further example, the conflicting modifications can be presented in pop up boxes or windows above the content.

In some cases, only a subset of the users can modify a data item assigned to a collection. Such a restriction can be enforced through a number of techniques. In some cases, to enforce such a restriction, the data item can be stored on a client device with read only access. Alternatively, a client device can be configured to not send any modifications made by a user who is not authorized to modify a data item. The data item sharing engine 220 can also be configured to not record or distribute any unauthorized modifications received. In a further configuration, a client device can refuse to receive a modification made by an unauthorized user. Additional methods of enforcing a modification restriction on a data item assigned to a collection are also possible.

Data item sharing can also be configured so that a new user can be invited to subscribe to a collection at any time. In some cases, only an administrator of the collection can invite a new user to subscribe to a collection. Alternatively, an administrator can review and approve or deny an invite submitted by a non-administrative user subscribed to the collection. Once a new user subscribes to a collection, the new user can receive all data items currently assigned to collection along with the modifications.

In some configurations, a data item previously assigned to a collection can be removed from the collection. The result of removing a data item from a collection can vary with the configuration. For example, in some cases, all users subscribed to the collection can keep the local copy of the data item, but modifications will no longer be propagated and newly subscribed users will not receive the removed data item. Alternatively, all local copies can be deleted, but in some configurations, the user who assigned the data item can keep the data item. Additionally, in some cases, the data item sharing engine 220 can maintain a record of the data item. In some cases, only an administrator of a collection and/or the user that assigned the data item can remove a data item from a collection.

Similar to a data item, in some configurations, a user can unsubscribe from a collection. The result of unsubscribing from a collection can vary with the configuration. For example, in some cases, all local copies of data items assigned to the collection, which were not assigned by the user, can be removed from the user's client devices. Alternatively, the user can keep the local copies, but modifications will no longer be propagated to the collection. Additionally, in some cases, an administrator can remove a user from a collection and/or alter a user's permissions associated with the collection. For example, if a user is abusing the collection by assigning undesirable content or the collection is associated with a project in a work environment and the user is no longer working on the project.

Additionally, in some configurations, a collection can be deleted. For example, if the collection is associated with a project and the project is cancelled or completed, the collection may no longer be needed. The result of deleting a collection can vary with the configuration. In some configurations, all local copies of the data items assigned to the collection can be deleted. In some cases, an administrator and/or the user who assigned a data item can maintain a data item. Alternatively, all users can maintain local copies of the data items assigned to the collection. Additionally, in some cases, the data item sharing engine 220 can maintain a record of the collection.

As previously mentioned, a local copy of data item assigned to a collection can be stored anywhere on a client device. Therefore, in some configurations, a shared data item can have a differentiating feature that distinguishes it on the client device from non-shared data items. For example, a shared data item can be highlighted, displayed in a different color, displayed with a different level of opacity, etc. Additionally, the differentiating feature can coordinate with the collection the data item is assigned to. For example, a data item assigned to collection 1 can be displayed in red and a data item assigned to collection 2 can be displayed in blue. In some cases, the file descriptor details can specify whether the data item is shared and/or the collection the data item is assigned to.

2.2.4 Privacy and Security

As described above, in some configurations, the cloud computing resources system can be used to store user data. The present disclosure contemplates that, in some instances, this gathered data might include personal and/or sensitive data. The present disclosure further contemplates that the entities responsible for the collection, analysis, disclosure, transfer, storage, or other use of such data should implement and consistently use privacy policies and practices that are generally recognized meeting or exceeding industry or governmental requirements for maintaining personal information data private and secure. For example, personal data from users should be collected for legitimate and reasonable uses of the entity and not shared or sold outside of those legitimate uses. Further, such collection should occur only after the informed consent of the users. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal data. That is, the present disclosure contemplates that hardware and/or software elements can be provided to prevent or block access to such personal data. For example, the present technology can be configured to allow users to select the data that is stored in cloud-based storage. In another example, the present technology can also be configured to allow a user to specify the data stored in cloud-based storage that can be shared with other users.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, non-personal data can be stored in cloud-based storage.

3. Usage

Figure 12:
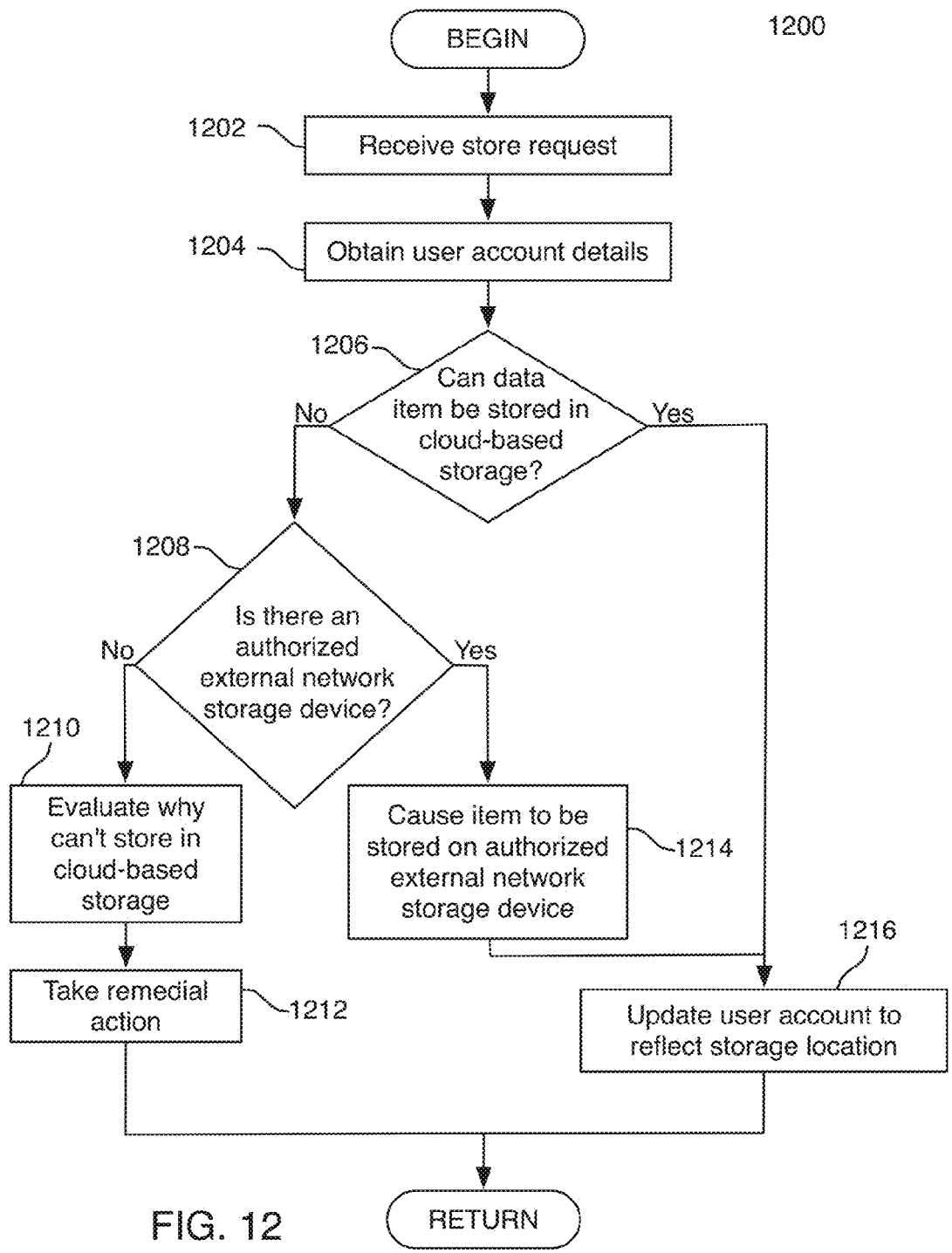
FIG. 12 illustrates an exemplary method embodiment for storing a data item using enhanced cloud-based storage.

The CCR system 200 facilitates a variety of cloud-based features including enhanced cloud-based storage, cloud-based resources, and data item sharing and collaboration. FIG. 12 is a flowchart illustrating an exemplary method 1200 for storing a data item using enhanced cloud-based storage. For the sake of clarity, this method is discussed in terms of an exemplary cloud computing resources system, such as is shown in FIG. 2. Although specific steps are show in FIG. 12, in other embodiments a method can have more or less steps than shown. The data item storing method can begin when the cloud computing resources system receives a request from a client device to store a data item (1202). In response to receiving the store request, the cloud computing resource system can obtain user account details (1204).

Using the user account details and the information regarding the data item, the cloud computing resource system can determine whether it can store the data item in cloud-based storage (1206). The cloud computing resources system can make the determination based on predefined criteria. For example, in some cases, the cloud computing resource system can be configured to allocate less space than the approved maximum capacity specified in the user account details. Alternatively, the cloud computing resources system can determine that the user has exceeded the user's approved maximum storage capacity as specified in the user account details. Therefore, the cloud computing system can make the determination based on space allocation and/or authorization. In some cases, the cloud computing resources system can determine that it is less efficient to store the data item in cloud-based storage than on an external network storage device. For example, storing the data item in cloud-based storage may increase latency and decrease performance over the external network storage device. Additionally, the cloud computing resources system can make the determination based on user preferences. For example, a user may specify that a particular data item or a particular type of data item should be stored on the external network storage device. Additional predefined criteria are also possible.

When the cloud computing resource system determines that the data item cannot be stored in cloud-based storage, the cloud computing resource system can check the account details to determine if there is an authorized external network storage device (1208). If at least one external network storage device is authorized in the user account details, the cloud computing resource system can cause the data item to be stored on the authorized external network storage device (1214). In some cases, the user account details can specify more than one authorized external network storage device. In this case, the cloud computing resource system can select an external network storage device from the available external network storages devices. In some cases, the selection can be based on predefined selection criteria, such as random, the amount of space available, distance from the cloud computing resource system, data item type, user preference, reliability of the external network storage device, etc. Additionally, the cloud computing storage device can update the user account details to reflect the storage location (1216).

If the user account details do not specify an authorized external network storage device, the cloud computing system can be configured to evaluate why the cloud computing device could not store the data item in cloud-based storage (1210). Based on the results of the evaluation, the cloud computing resource system can take remedial action (1212). For example, if the cloud computing resource system determines that the data item was not stored in cloud-based storage because the cloud computing resource system allocated less space than is authorized in the user account details, the cloud computing resources system can allocate more space and thereafter store the data item using the cloud computing resources. In another example, if the cloud computing resource system determines that the data item was not stored in cloud-based storage because the user exceeded the amount of space authorized in the user account details, the cloud computing resources system can notify the user. In yet another example, if the cloud computing resource system determines that the data item was not stored in cloud-based storage because it was determined that it would be more efficient to store the data item on an external network storage device, the cloud computing resource system can store the data item in cloud-based storage. In a further example, if the cloud computing resource system determines that the user requested that the data item be stored on an external network storage device, the cloud computing resources system can notify the user of the lack of an authorized external network storage device and/or request permission to store the data item in cloud-based storage. Additional remedial actions are also possible. After completing step 1212 or 1216, the cloud computing resources system can resume previous processing, which can include repeating method 1200.

Figure 13:
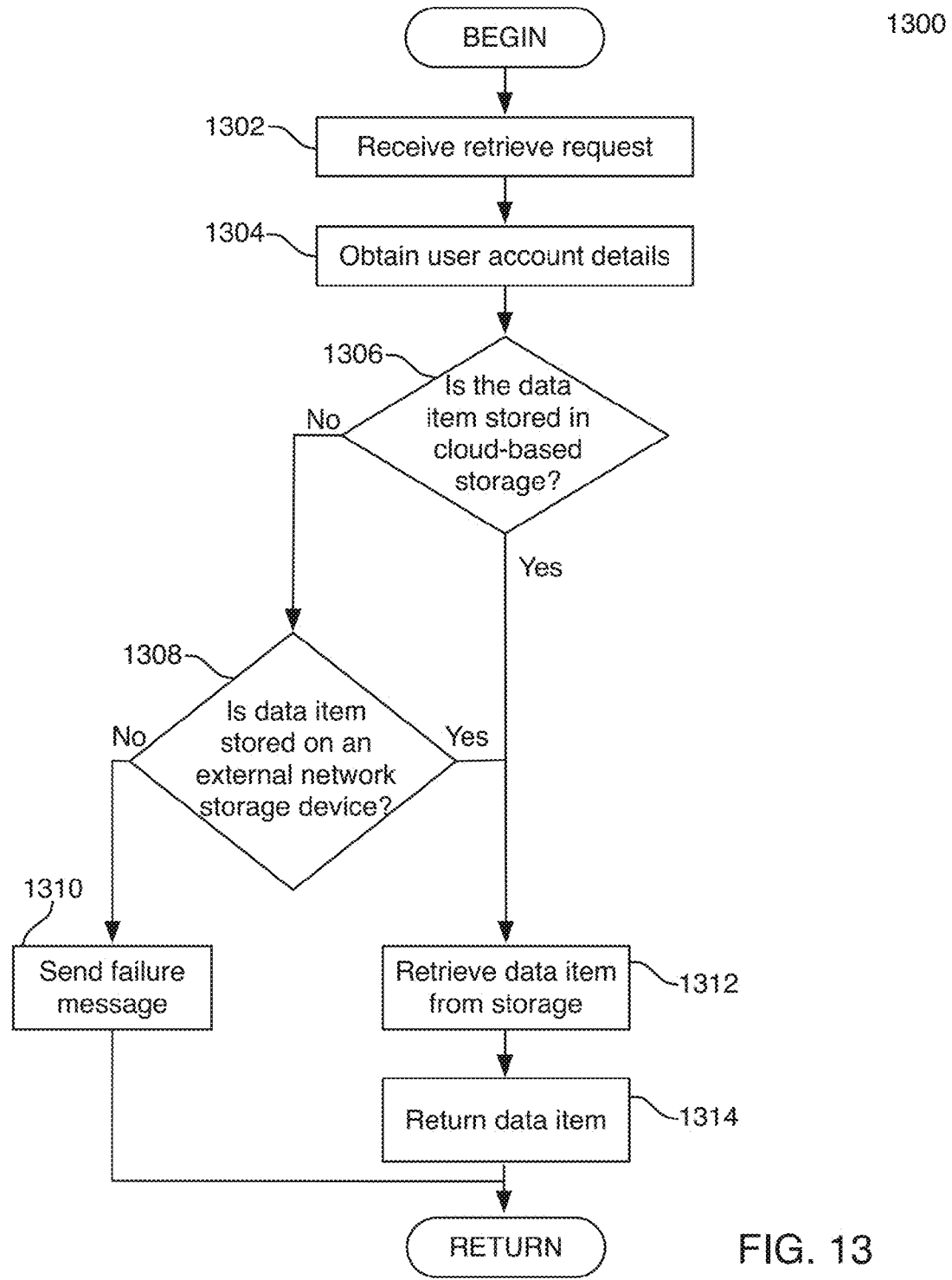
FIG. 13 illustrates an exemplary method embodiment for retrieving a data item using enhanced cloud-based storage.

FIG. 13 is a flowchart illustrating an exemplary method 1300 for retrieving a data item using enhanced cloud-based storage. For the sake of clarity, this method is discussed in terms of an exemplary cloud computing resources system, such as is shown in FIG. 2. Although specific steps are shown in FIG. 13, in other embodiments a method can have more or less steps than shown. The data item retrieval method can begin when the cloud computing resources system receives a request from a client device to retrieve a data item (1302). In response to receiving the retrieve request, the cloud computing resources system can obtain user account details (1304).

Using the user account details and the information regarding the data item, the cloud computing resources system can identify whether the data item is stored in cloud-based storage (1306). If the cloud computing resources system determines that the data item is not stored in cloud-based storage, the cloud computing resources system can identify whether the data item is stored on an external network storage device (1308). If the cloud computing resources system is unable to identify a storage location of the requested data item, the cloud computing resources system can send a failure message to the requesting client device (1310). In some cases, a failure can occur if the data item was never stored in cloud-based storage. Alternatively, a failure can occur if the data item was stored on an external network storage device, but the device is no longer accessible by the cloud computing resources system, e.g., the user disconnected the external network storage device form the network. Additional failure scenarios are also possible.

If the cloud computing resources system is able to identify a storage location of the requested data item, the cloud computing resources system can retrieve the data item from the storage location (1312) and send the data item to the requesting client device (1314). After completing step 1310 or 1314, the cloud computing resource system can resume previous processing, which can include repeating method 1300.

Figure 14:
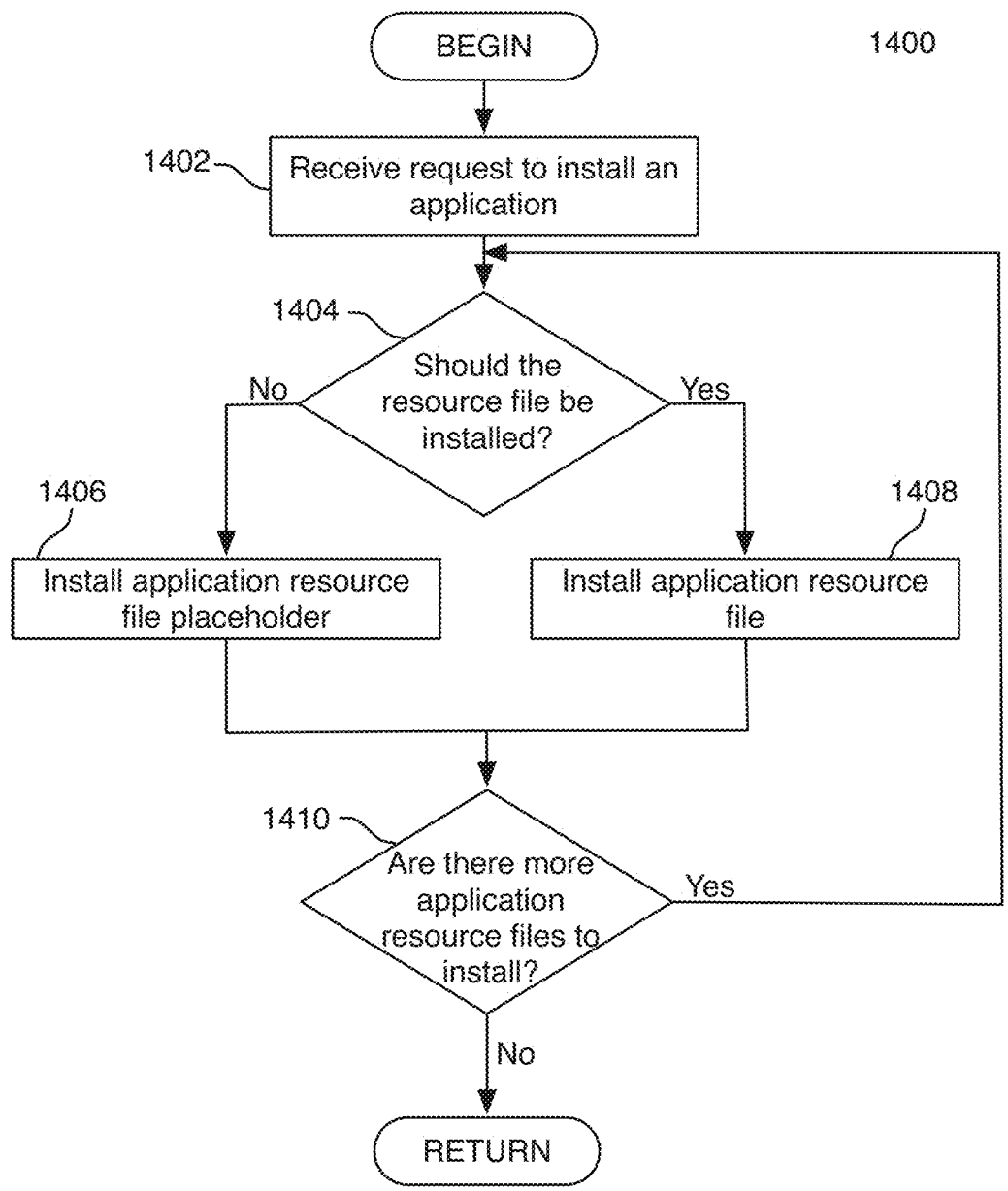
FIG. 14 illustrates an exemplary method embodiment for installing an application with application resource file placeholders.

FIG. 14 is a flowchart illustrating an exemplary method 1400 for installing an application with application resource file placeholders. For the sake of clarity, this method is discussed in terms of an exemplary client device containing an operating system configured for file retrieval, and that is connected to a cloud computing resources system, such as is shown in FIG. 2. Although specific steps are shown in FIG. 14, in other embodiments a method can have more or less steps than shown. The application installation method can begin when the operating system running on the client device receives a request to install an application that includes a main application executable and one or more application resource files (1402). In response to the request, the operating system determines whether the one or more application resource files should be installed (1404). In some cases, the determination whether to install an application resource files can be based on predefined criteria, such as application resource file size, maximum total size of installed application resource files for the application, target application use, or application usage history. If the operating system determines that the application resource file should be installed, then the operating system installs it (1408). However, if the operating system determines that the application resource file should not be installed, then the operating system installs an application resource file placeholder (1406). In some cases, an application resource file placeholder can have the appearance of an actual application resource file, but is instead an empty file.

After installing either an application resource file or an application resource file placeholder, the operating system determines whether there are more application resource files to install (1410). If so, the operating system repeats the process. After completing step 1410, the operating system on the client device can resume previous processing, which can include repeating method 1400.

Figure 15:
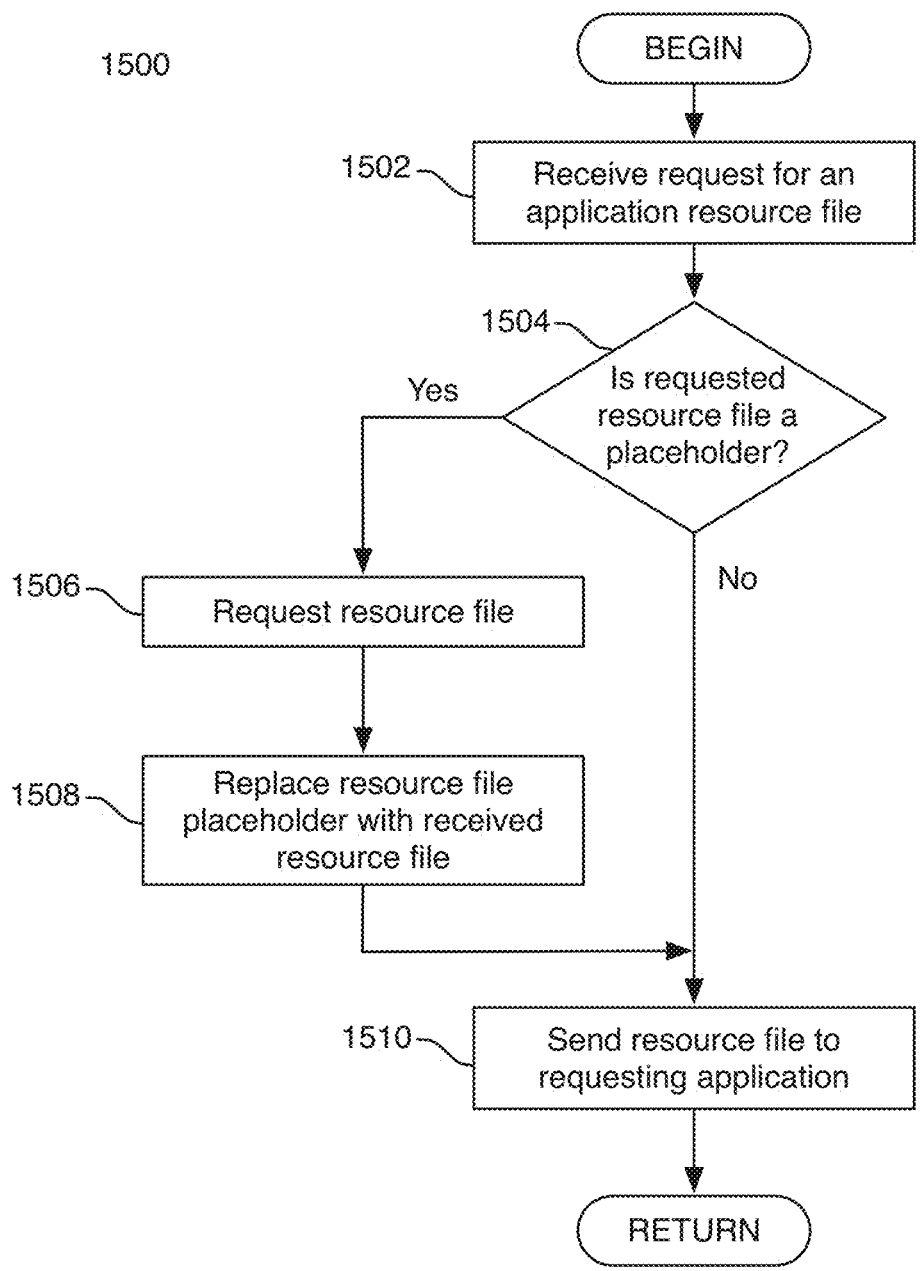
FIG. 15 illustrates an exemplary method embodiment for obtaining an application resource file.

FIG. 15 is a flowchart illustrating an exemplary method 1500 for obtaining an application resource file. For the sake of clarity, this method is discussed in terms of an exemplary client device containing an operation system configured for file retrieval, and that is connected to a cloud computing resources system, such as is shown in FIG. 2. Although specific steps are shown in FIG. 15, in other embodiments a method can have more or less steps than shown. The application resource file retrieval method can begin when the operating system running on the client device receives a request from an application, also running on the client device, for an application resource file (1502). In response to the request, the operating system determines whether the application resource file stored on the client device is the actual application resource file or is instead an application resource file placeholder (1504). In some cases, an application resource file placeholder can have the appearance of an actual application resource file, but is instead an empty file. In some configurations, the operating system can determine that an application resource file is a placeholder when a special bit on the file is set. Other techniques for differentiating an actual application resource file from a placeholder are also possible.

If the operating system determines that a requested application resource file corresponds to an application resource file placeholder, the operating system can trigger a fault. The triggered fault can cause the client device to request the application resource file from a cloud computing resources system (1506). Upon receiving the application resource file, the operating system can replace the placeholder with the received application resource file (1508). Finally, the operating system can send the application resource file to the requesting application (1510). After completing step 1510, the operating system on the client device can resume previous processing, which can include repeating method 1500.

Figure 16:
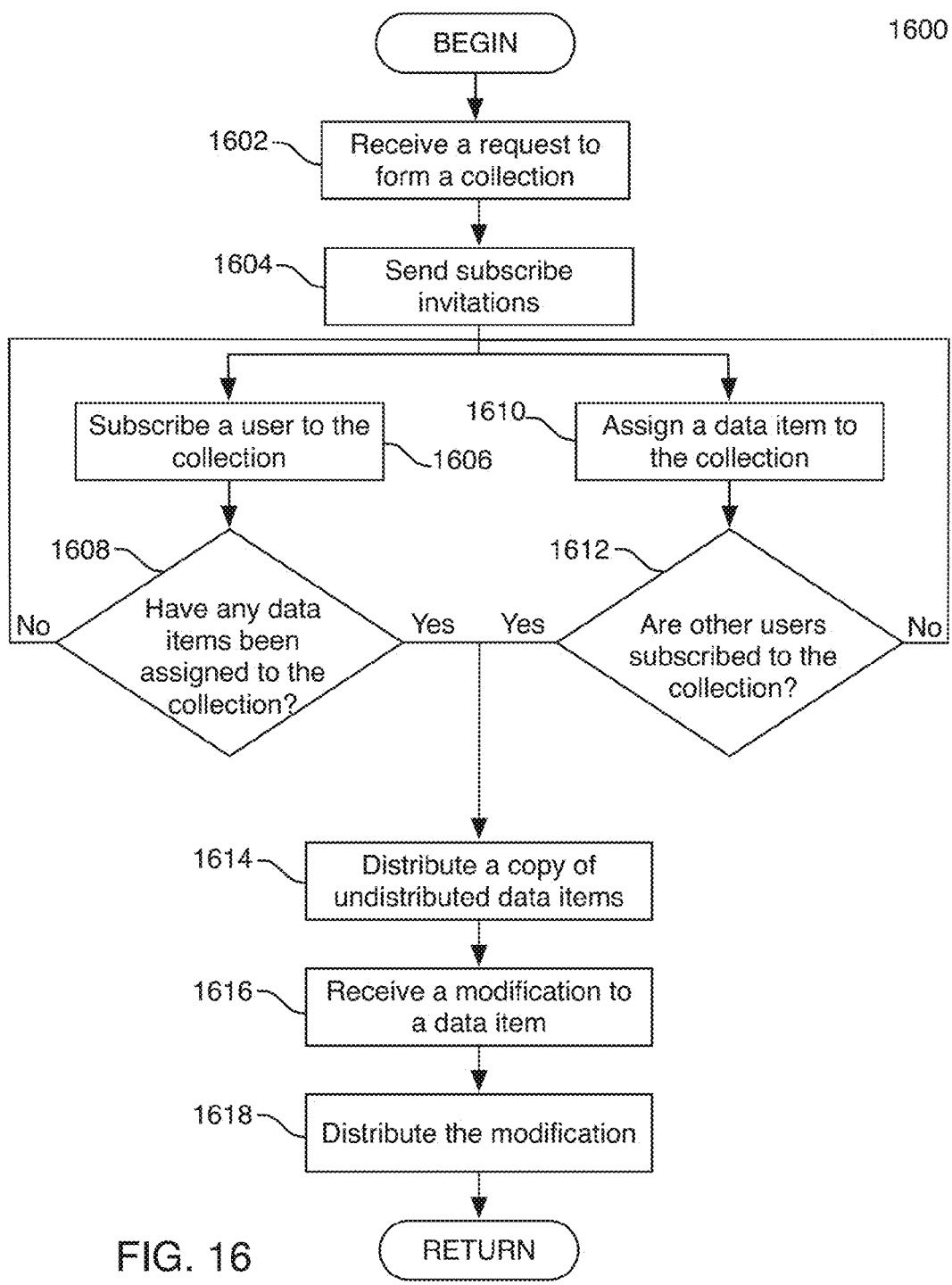
FIG. 16 illustrates an exemplary method embodiment for data item sharing and collaboration.

FIG. 16 is a flowchart illustrating an exemplary method 1600 for data item sharing and collaboration. For the sake of clarity, this method is discussed in terms of an exemplary cloud computing resources system, such as is shown in FIG. 2. However, this method can also be performed in part or entirely on a client device. Although specific steps are shown in FIG. 16, in other embodiments a method can have more or less steps than shown. The data item sharing and collaboration method can begin when the cloud computing resources system receives a request from a client device to form a data item group or collection (1602). The request to form a collection can include a set of user identifiers. Additionally, in some cases, the request can include one or more data items to assign to the collection. In addition to the set of user identifiers received with the collection formation request, the cloud computing resource system can separately receive a request to invite a user to subscribe to a collection.

In response to receiving the request to form a collection, or a separate request to invite a user to subscribe to a collection, the cloud computing resources system can send an invitation to subscribe to the collection to each user associated with a user identifier included in the request (1604). At some later point, the cloud computing resources system can receive a response to a subscribe invitation from an invited user. Based on the response, the cloud computing resources system can subscribe the user to the collection (1606). In some cases, the cloud computing resources system can require the user to authenticate with the system prior to completing the subscription process. After subscribing the user, the CCR system can check if data items have been assigned to the collection (1608). If so, the cloud computing resource system can send a copy of each assigned data item to a client device associated with the subscribed user (1614). In some cases, a user can have multiple client devices authorized in the user's account. In this case, the cloud computing resources system can send a copy to each authorized client device.

In some cases, a request to form a collection can include one or more data items. Alternatively, the cloud computing resource system can receive a separate request to assign a data item to a collection. In response to receiving a data item, the cloud computing resource system can assign the data item to the collection (1610). After assigning, the data item, the cloud computing resource system can determine if there are any users subscribed to the collection other than the user who assigned the data item to the collection (1612). If so, the cloud computing resource system can send a copy of the data item to a client device associated with the subscribed user (1614). In some cases, a user can have multiple client devices authorized in the user's account. In this case, the cloud computing resources system can send a copy to each authorized client device. In some cases, the cloud computing resources system can concurrently subscribe a user to a collection (1606) and assign a data item to the collection (1610).

At some later point, the cloud computing resource system can receive a modification to a data item assigned to the collection (1616). In some cases, the modification can be a sequence of modifications. Additionally, the cloud computing resources system can receive modifications to a data item from multiple users. In response to receiving the modification, the cloud computing resources system can distribute the modification to each user subscribed to the collection (1618). After completing step 1618, the cloud computing resource system can resume previous processing, which can include repeating method 1600.

Figure 17:
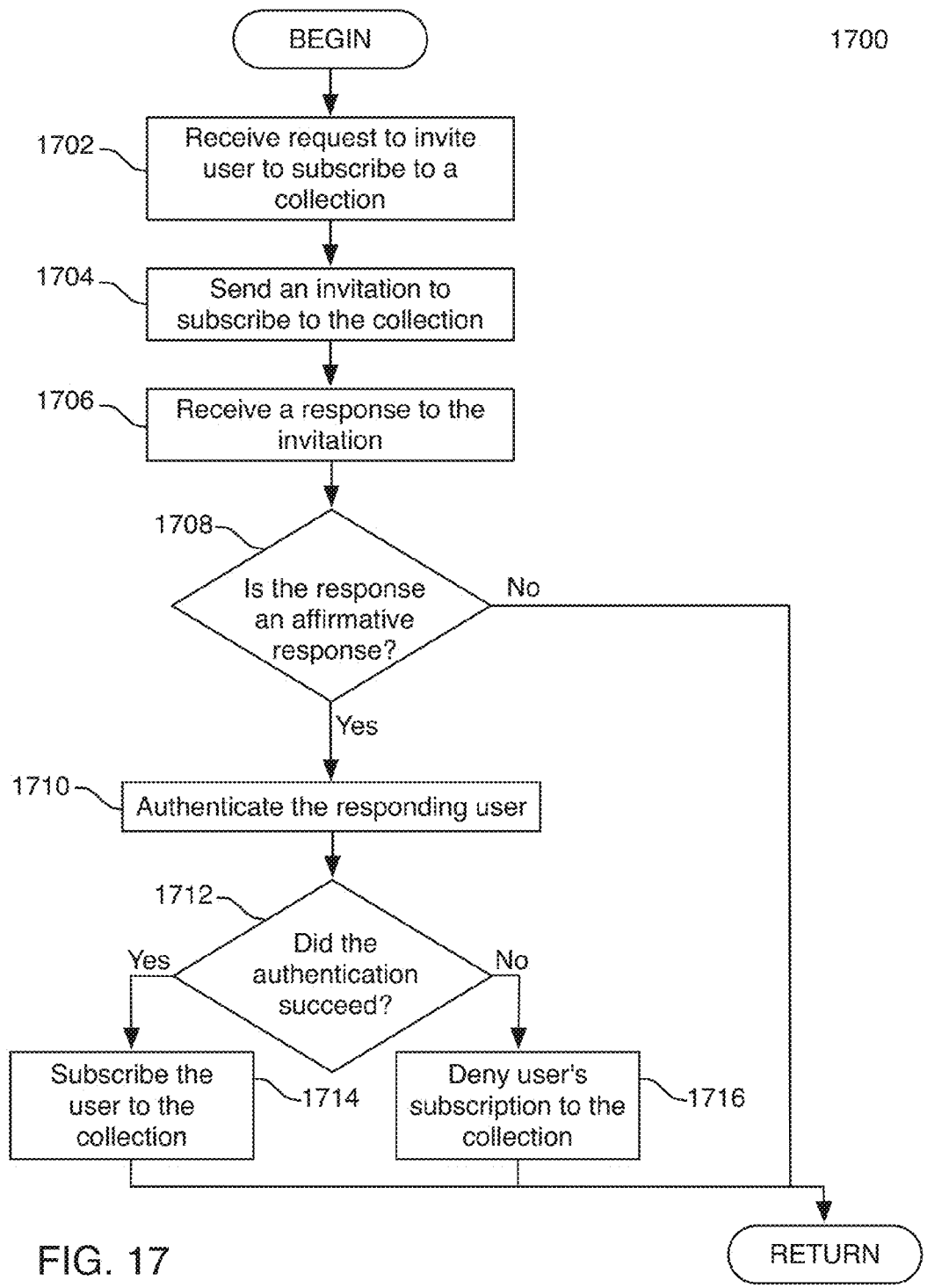
FIG. 17 illustrates an exemplary method embodiment for subscribing a user to a collection.

FIG. 17 is a flowchart illustrating an exemplary method 1700 for subscribing a user to a collection. For the sake of clarity, this method is discussed in terms of an exemplary cloud computing resources system, such as is shown in FIG. 2. However, this method can also be performed in part or entirely on a client device. Although specific steps are shown in FIG. 17, in other embodiments a method can have more or less steps than shown. The user subscription method can begin when the cloud computing resources system receives a request to invite a user to subscribe to a collection (1702). The request can include a user identifier. In some cases, the cloud computing resources system can receive the request to invite a user to subscribe to a collection as part of a request to form the collection. Alternatively, the cloud computing resources system can receive a separate request to invite a user. In some cases, the cloud computing resources system can receive a request to invite a user from an administrator of the collection and/or another user with authorization to invite users to subscribe to the collection.

In response to receiving a request to invite a user to subscribe to a collection, the cloud computing resources system can send an invitation to subscribe to the collection to a user associated with the user identifier (1704). The cloud computing resources system can be configured to send the invitation using a variety of different techniques. For example, the cloud computing resource system can send the invitation via email, instant message, SMS, a notification in a client side application, a pop-up window on a client device, etc.

At some later time, the cloud computing resources system can receive a response from the invited user (1706). If the cloud computing resources system determines that the response is an affirmative response (1708), the cloud computing resource system can authenticate the responding user (1710). The cloud computing resources system can use any authentication process. For example, the cloud computing resource system can authenticate the user by requiring the user to log into the user account to which the subscription invitation was sent. Alternative techniques for authenticating the user are also possible.

In some configurations, a user can respond to the subscribe invitation with a negative response. That is, the user can send an explicit response that the user does not want to subscribe to the collection, as opposed to simply ignoring the invitation. In some cases, the cloud computing resources system can ignore an explicit negative response. Alternatively, the cloud computing resources system can take an action, such as notifying the user that requested the invitation and/or update any records associated with the collection.

The cloud computing resources system can determine whether the user authentication succeeded (1712) and respond accordingly. If the authentication did succeed, the cloud computing resources system can complete the user's subscription to the collection (1714). Completing the user's subscription can include adding the user's identifier to the collection's records. In some cases, upon completing the subscription, the cloud computing resources system can send a notification to the user that requested the invitation and/or an administrator of the collection. If the authentication failed, the cloud computing resources system can deny the user's subscription to the collection (1716). In some configurations, upon a failed authentication, the user can attempt to complete the authentication process again. Additionally, in some cases, the cloud computing resource system can cap the number of failed authentication attempts. Furthermore, in some cases, upon a failed subscription attempt, the cloud computing resource system can send a notification to the user that requested the invitation and/or an administrator of the collection. After completing step 1714 or 1716, or upon a negative response at step 1708, the cloud computing resources system can resume previous processing, which can include repeating method 1700.

Figure 18:
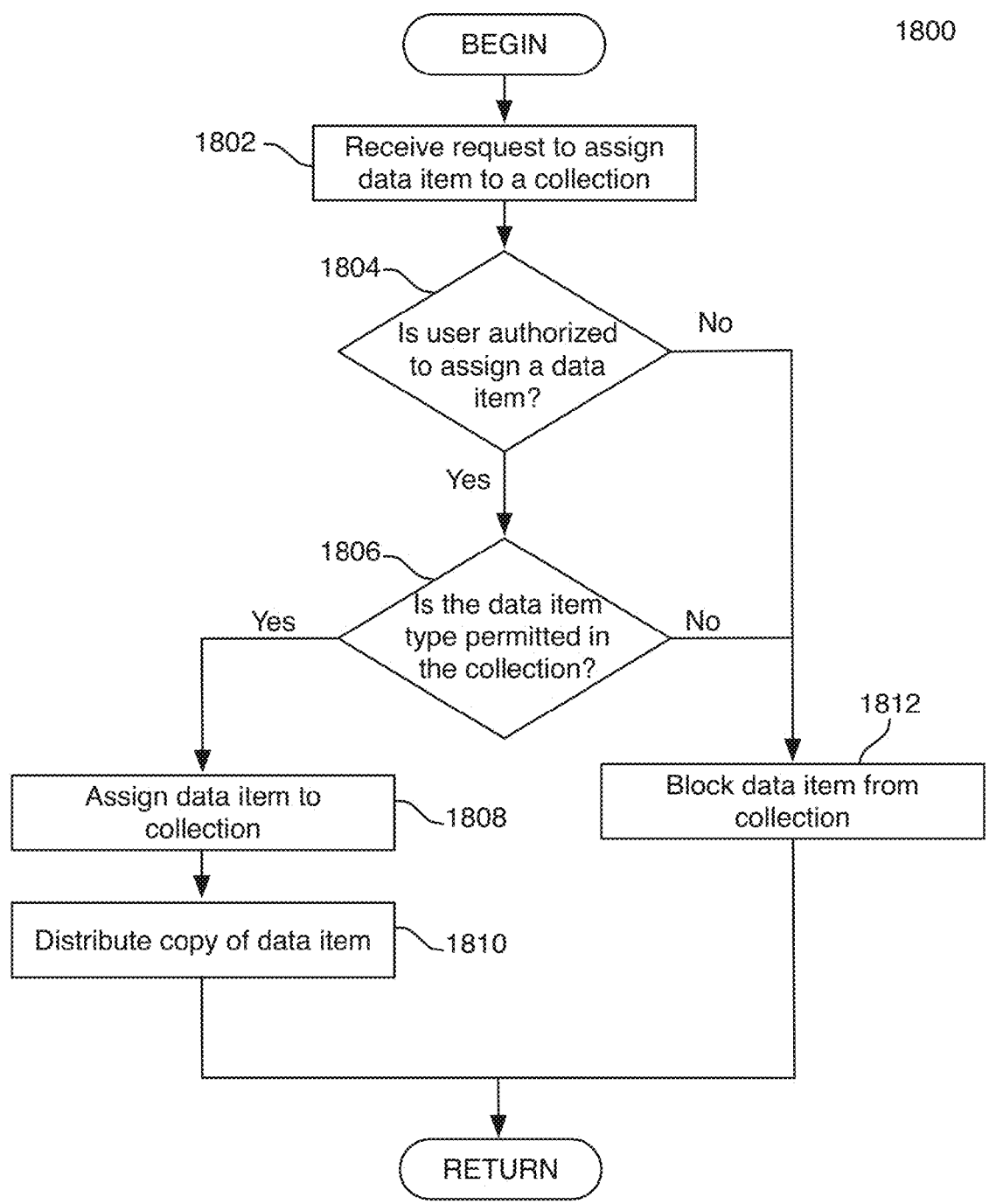
FIG. 18 illustrates an exemplary method embodiment for assigning a data item to a collection.

FIG. 18 is a flowchart illustrating an exemplary method 1800 for assigning a data item to a collection. For the sake of clarity, this method is discussed in terms of an exemplary cloud computing resources system, such as is shown in FIG. 2. However, this method can also be performed in part or entirely on a client device. Although specific steps are shown in FIG. 18, in other embodiments a method can have more or less steps than shown. The data item assignment method can begin when the cloud computing resources system receives a request to assign a data item to a collection (1802). In some cases, the cloud computing resources system can receive the request to assign a data item to a collection as part of a request to form the collection. Alternatively, the cloud computing resources system can receive a separate request to assign a data item to a collection.

In response to receiving a request to assign a data item to a collection, the cloud computing resources system can check if the requesting user is authorized to assign a data item to the collection (1804). In some cases, a collection can have a policy such that only a subset of the users subscribed to the collection are authorized to assign a data item to the collection. For example, a collection can have a policy that only administrators can assign data items to the collection.

If the cloud computing resources system determines that the user is permitted to assign a data item to the collection, the cloud computing resources system can check if the data item is of a type that is permitted to be assigned to the collection (1806). In some cases, a collection can have a policy that prohibits some data item types from being assigned to the collection. For example, a collection can have a policy that only word processing documents can be assigned to the collection.

If the cloud computing resources system determines that the data item is of a type that is permitted to be assigned to the collection, the cloud computing resources system can assign the data item to the collection (1808). Assigning the data item to the collection can include adding the data item to the collection's records. In some cases, upon assigning the data item, the cloud computing resources system can send a notification to the user that requested the assignment and/or an administrator of the collection.

Upon assigning the data item to the collection, the cloud computing resources system can distribute a copy of the data item to a client device associated with each user subscribed to the collection (1810). In some cases, a user can have multiple client devices authorized in a user's account. In this case, the cloud computing resources system can send a copy to each authorized client device. In some configurations, the cloud computing resources system can distribute a notification to each user subscribed to the collection that a new data item has been assigned to the collection instead of and/or in addition to sending the data item. The cloud computing resources system can be configured to send the notification using a variety of different techniques. For example, the cloud computing resource system can send the notification via email, instant message, SMS, a notification in a client side application, a pop-up window on a client device, etc.

If the cloud computing resources system determine that the user is not authorized to assign a data item to the collection and/or that the data item type is not permitted in the collection, the cloud computing resources system can block the data item from the collection (1812). In some configurations, upon a failed assignment, the cloud computing resources system can send a notification to the user requesting the assignment and/or an administrator of the collection. In some cases, the notification can indicate why the assignment failed. After completing step 1810 or 1812, the cloud computing resource system can resume previous processing, which can include repeating method 1800.

Figure 19:
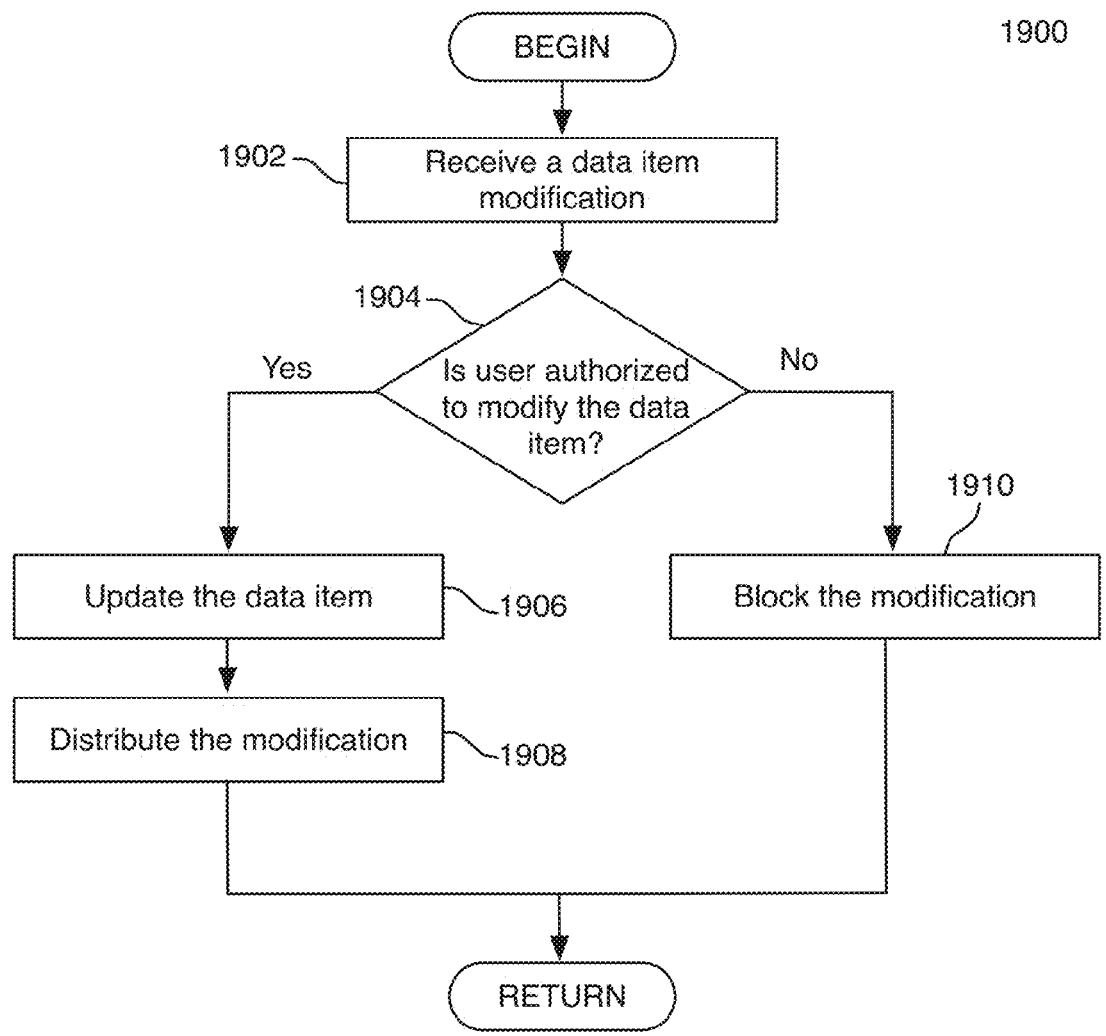
FIG. 19 illustrates an exemplary method embodiment for modifying a data item assigned to a collection.

FIG. 19 is a flowchart illustrating an exemplary method 1900 for modification a data item assigned to a collection. For the sake of clarity, this method is discussed in terms of an exemplary cloud computing resources system, such as is shown in FIG. 2. However, this method can also be performed in part or entirely on a client device. Although specific steps are shown in FIG. 19, in other embodiments a method can have more or less steps than shown. The data item modification method can begin when the cloud computing resources system receives a modification to a data item assigned to the collection (1902). In some cases, the modification can be the entire data item. Alternatively, the modification can be a piece of the data item that indicates the difference between the two versions. Additionally, in some cases, a modification can be a sequence of modifications.

In response to receiving a modification to a data item, the cloud computing resources system can check if the user who sent the modification is authorized to modify the data item (1904). In some cases, a collection can have a policy such that only a subset of the users subscribed to the collection are authorized to modify the data items. Alternatively, the policy can be sent at the data item level. That is, each data item can have an associated set of permission that indicates which users are permitted to make modifications.

If the cloud computing resources system determines that the user is permitted to modify the data item, the cloud computing resources system can update the data item (1906). In some cases, the cloud computing resources system can maintain a copy of the data item. When a modification is received, the cloud computing resources system can merge the modification in the copy of the data item. Additionally, the cloud computing resources system can maintain a record of the modifications. Upon receiving a modification, the cloud computing resources system can distribute the modification to a client device associated with each user subscribed to the collection (1908).

If the cloud computing resources system determines that the user is not permitted to modify the data item, the cloud computing resources system can block the modification (1910). In some configurations, upon a failed modification, the cloud computing resources system can send a notification to the user attempting to share a modification and/or an administrator of the collection. In some cases, the notification can indicate why the modification failed. After completing step 1908 or 1910, the cloud computing resource system can resume previous processing, which can include repeating method 1900.

4. Exemplary System

Figure 20:
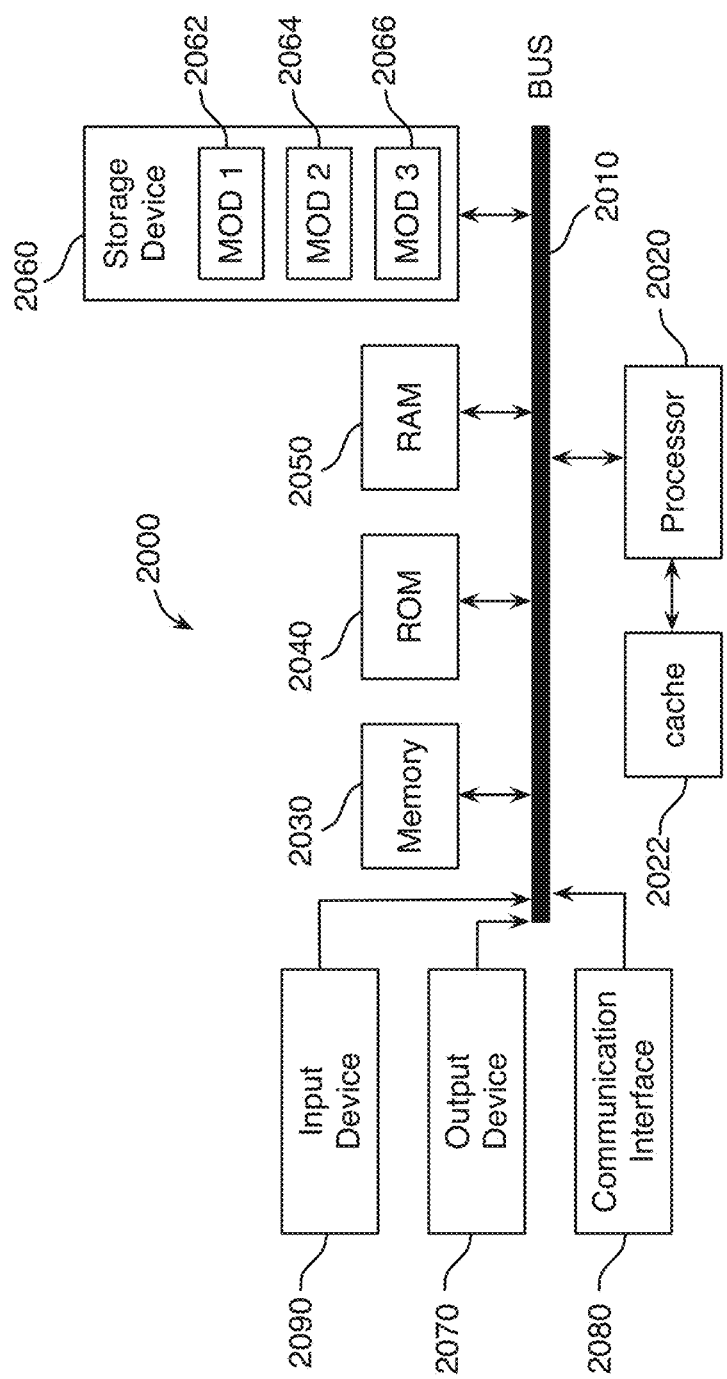
FIG. 20 illustrates an example system embodiment.

With reference to FIG. 20, an exemplary system 2000 includes a general-purpose computing device 2000, including a processing unit (CPU or processor) 2020 and a system bus 2010 that couples various system components including the system memory 2030 such as read only memory (ROM) 2040 and random access memory (RAM) 2050 to the processor 2020. The system 2000 can include a cache 2022 connected directly with, in close proximity to, or integrated as part of the processor 2020. The system 2000 copies data from the memory 2030 and/or the storage device 2060 to the cache for quick access by the processor 2020. In this way, the cache provides a performance boost that avoids processor 2020 delays while waiting for data. These and other modules can control or be configured to control the processor 2020 to perform various actions. Other system memory 2030 may be available for use as well. The memory 2030 can include multiple different types of memory with different performance characteristics. It can be appreciated that the disclosure may operate on a computing device 2000 with more than one processor 2020 or on a group or cluster of computing devices networked together to provide greater processing capability. The processor 2020 can include any general purpose processor and a hardware module or software module, such as module 1 2062, module 2 2064, and module 3 2066 stored in storage device 2060, configured to control the processor 2020 as well as a special-purpose processor where software instructions are incorporated into the actual processor design. The processor 2020 may essentially be a completely self-contained computing system, containing multiple cores or processors, a bus, memory controller, cache, etc. A multi-core processor may be symmetric or asymmetric.

The system bus 2010 may be any of several types of bus structures including a memory bus or memory controller, a peripheral bus, and a local bus using any of a variety of bus architectures. A basic input/output (BIOS) stored in ROM 2040 or the like, may provide the basic routine that helps to transfer information between elements within the computing device 2000, such as during start-up. The computing device 2000 further includes storage devices 2060 such as a hard disk drive, a magnetic disk drive, an optical disk drive, tape drive or the like. The storage device 2060 can include software modules 2062, 2064, 2066 for controlling the processor 2020. Other hardware or software modules are contemplated. The storage device 2060 is connected to the system bus 2010 by a drive interface. The drives and the associated computer readable storage media provide nonvolatile storage of computer readable instructions, data structures, program modules and other data for the computing device 2000. In one aspect, a hardware module that performs a particular function includes the software component stored in a non-transitory computer-readable medium in connection with the necessary hardware components, such as the processor 2020, bus 2010, display 2070, and so forth, to carry out the function. The basic components are known to those of skill in the art and appropriate variations are contemplated depending on the type of device, such as whether the device 2000 is a small, handheld computing device, a desktop computer, or a computer server.

Although the exemplary embodiment described herein employs the hard disk 2060, it should be appreciated by those skilled in the art that other types of computer readable media which can store data that are accessible by a computer, such as magnetic cassettes, flash memory cards, digital versatile disks, cartridges, random access memories (RAMs) 2050, read only memory (ROM) 2040, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 2000, an input device 2090 represents any number of input mechanisms, such as a microphone for speech, a touch-sensitive screen for gesture or graphical input, keyboard, mouse, motion input, speech and so forth. An output device 2070 can also be one or more of a number of output mechanisms known to those of skill in the art. In some instances, multimodal systems enable a user to provide multiple types of input to communicate with the computing device 2000. The communications interface 2080 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 2020. The functions these blocks represent may be provided through the use of either shared or dedicated hardware, including, but not limited to, hardware capable of executing software and hardware, such as a processor 2020, that is purpose-built to operate as an equivalent to software executing on a general purpose processor. For example, the functions of one or more processors presented in FIG. 20 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 2040 for storing software performing the operations discussed below, and random access memory (RAM) 2050 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 2000 shown in FIG. 20 can practice all or part of the recited methods, can be a part of the recited systems, and/or can operate according to instructions in the recited non-transitory computer-readable storage media. Such logical operations can be implemented as modules configured to control the processor 2020 to perform particular functions according to the programming of the module. For example, FIG. 20 illustrates three modules Mod1 2062, Mod2 2064 and Mod3 2066 which are modules configured to control the processor 2020. These modules may be stored on the storage device 2060 and loaded into RAM 2050 or memory 2030 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
   executing, by a client device, a software application, the software application associated with a set of asset files that can be utilized to provide functionality of the software application, the functionality provided by the set of asset files being different than original functionality of the software application;
   storing, in a local memory of the client device, a first asset file of the set of asset files based on usage history of the first asset file by the software application;
   receiving, by the client device, a request to access a second asset file from the set of asset files;
   in response to determining that the second asset file is not stored in the local memory of the client device, transmitting, by the client device, to a cloud storage system, an asset request for the second asset file, the asset request including an identifier for the second asset file; and
   receiving the second asset file from the cloud storage system in response to the asset request, wherein after being received, the second asset file can be utilized to provide functionality of the software application.

2. The method of claim 1, wherein the request is received in response to detection of a trigger associated with the second asset file.

3. The method of claim 1, further comprising:
   storing, to the local memory, the second asset file received from the cloud storage system.

4. The method of claim 3, further comprising:
   determining that an amount of available storage of the local memory meets or exceeds a threshold amount of available storage; and
   in response to determining that the amount of available storage of the local memory meets or exceeds the threshold amount of available storage, deleting the first asset file from the local memory.

5. The method of claim 4, wherein deleting the first asset file from the local memory further comprises
   evaluating the first asset file and the second asset file stored on the local memory, yielding an evaluation; and
   based on the evaluation, selecting the first asset file to be deleted.

6. The method of claim 5, wherein the evaluation comprises:
   determining that an anticipated need by the software application for the first asset file is less than an anticipated need of the software application for the second asset file stored in the local memory.

7. The method of claim 6, wherein the evaluation further comprises:
   determining, based on usage patterns of the first asset file and the second asset file by the software application, the anticipated need of the software application for the second asset file.

8. A client device comprising:
   one or more computer processors; and
   a local memory storing instructions that, when executed by the one or more computer processors, cause the client device to:
     execute a software application, the software application including a set of asset files that can be utilized to provide functionality of the software application, the functionality provided by the set of asset files being different than original functionality of the software application;
     store, in the local memory, a first asset file of the set of asset files based on usage history of the first asset file by the software application;
     receive a request to access a second asset file from the set of asset files;
     in response to determining that the second asset file is not stored in the local memory of the client device, transmit, to a cloud storage system, an asset request for the second asset file, the asset request including an identifier for the second asset file; and
     receive the second asset file from the cloud storage system in response to the asset request, wherein after being received, the second asset file can be utilized by to provide functionality of the software application.

9. The client device of claim 8, wherein the request is received in response to detection of a trigger associated with the second asset file.

10. The client device of claim 8, wherein the instructions further cause the client device to:
    store, to the local memory, the second asset file received from the cloud storage system.

11. The client device of claim 10, wherein the instructions further cause the client device to:

determine that an amount of available storage of the local memory meets or exceeds a threshold amount of available storage; and in response to determining that the amount of available storage of the local memory meets or exceeds the threshold amount of available storage, deleting the first asset file from the local memory.

12. The client device of claim 11, wherein deleting the first asset file from the local memory further comprises:

evaluating the first asset file and the second asset file stored on the local memory, yielding an evaluation; and based on the evaluation, selecting the first asset file to be deleted.

13. The client device of claim 12, wherein the evaluation comprises:

determining that an anticipated need by the software application for the first asset file is less than an anticipated need of the software application for the second asset file stored in the local memory.

14. The client device of claim 13, wherein the evaluation further comprises:

determining, based on usage patterns of the first asset file and the second asset file by the software application, the anticipated need by the software application for the first asset file and the anticipated need of the software application for the second asset file.

15. A non-transitory computer-readable medium storing instructions that, when executed by one or more computer processors of a client device, cause the client device to:

execute a including a set of asset files that can be utilized by the first executable program to provide functionality of the first software application, the functionality provided by the set of asset files different than original functionality of the software application;

store in local memory of the client device, a first asset file of the set of asset files based on usage history of the first asset file by the software application;

receive a request by the first executable program to access a second asset file from the set of asset files;

in response to determining that the second asset file is not stored in the local memory of the client device, transmit, to a cloud storage system, an asset request for the second asset file, the asset request including an identifier for the second asset file; and receive the second asset file from the cloud storage system in response to the asset request, wherein after being received, the second asset file can be utilized to provide functionality of the first software application.

16. The non-transitory computer-readable medium of claim 15, wherein the request is received in response to detection of a trigger associated with the second asset file.

17. The non-transitory computer-readable medium of claim 15, wherein the instructions further cause the client device to:

store, to the local memory, the second asset file received from the cloud storage system.

18. The non-transitory computer-readable medium of claim 17, wherein the instructions further cause the client device to:

determine that an amount of available storage of the local memory meets or exceeds a threshold amount of available storage; and in response to determining that the amount of available storage of the local memory meets or exceeds the threshold amount of available storage, deleting the first asset file from the local memory.

19. The client device of claim 18, wherein deleting the first asset file from the local memory further comprises:

evaluating the first asset file and the second asset file stored on the local memory, yielding an evaluation; and based on the evaluation, selecting the first asset file to be deleted.

20. The client device of claim 19, wherein the evaluation comprises:

determining that an anticipated need by the software application for the first asset file is less than an anticipated need of the software application for the second asset file stored in the local memory.

* * * * *